United States Patent [19]

Imai et al.

[11] Patent Number: 5,687,157
[45] Date of Patent: Nov. 11, 1997

[54] METHOD OF RECORDING AND REPRODUCING DIGITAL AUDIO SIGNAL AND APPARATUS THEREOF

[75] Inventors: Kenichi Imai; Tadao Suzuki, both of Tokyo; Kenzo Akagiri, Kanagawa; Makoto Akune, Tokyo, all of Japan

[73] Assignee: Sony Corporation, Tokyo, Japan

[21] Appl. No.: 503,844

[22] Filed: Jul. 18, 1995

[30] Foreign Application Priority Data

Jul. 20, 1994 [JP] Japan ..................... 6-168471

[51] Int. Cl.⁶ ............................................ G11B 7/00
[52] U.S. Cl. ................................. 369/124; 369/59
[58] Field of Search ....................... 369/48, 47, 59, 369/32, 124; 360/40, 48, 32

[56] References Cited

U.S. PATENT DOCUMENTS 5,408,478  4/1995  Ohmori et al. ..................... 369/54

Primary Examiner—Nabil Hindi
Attorney, Agent, or Firm—Limbach & Limbach L.L.P.

[57] ABSTRACT

An audio signal recording and reproduction apparatus enabling a low frequency band signal component to be reproduced by existing reproduction apparatuses and a high frequency band component to be processed as well. A digital audio signal is divided into a low frequency band signal component and high frequency band signal component by a frequency band division filter. The low band signal component is subjected to straight PCM processing to maintain compatibility with existing reproduction methods. The high frequency band signal component is subjected to high frequency coding through a requantization circuit and entropy coding circuit. A comparison circuit compares the straight PCM signals and the high efficiency coded signals to determine if they will fit into a predetermined bit length and, when not fitting, causes the requantization circuit to perform requantization to shorten the bit length. The bit redistribution circuit performs redistribution between the straight PCM bit data and the high efficiency coded bit data. The wave data is recorded on a CD. On the CD may also be recorded the sub-code data of an entropy coding circuit and the number of requantization bits of a requantization circuit.

34 Claims, 16 Drawing Sheets

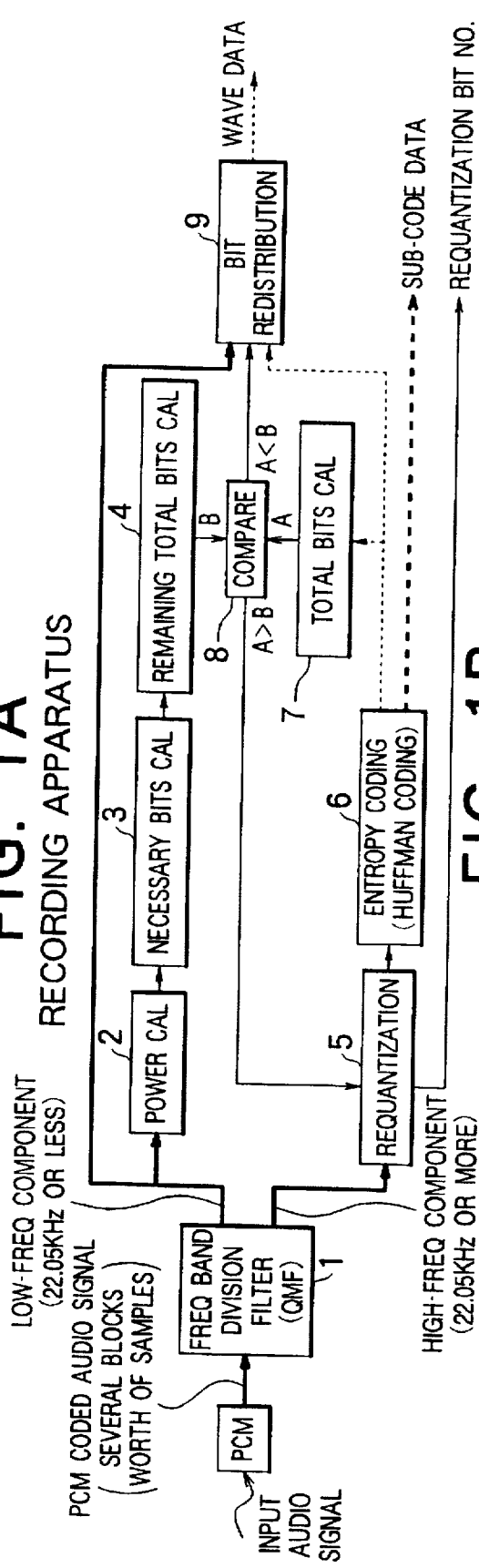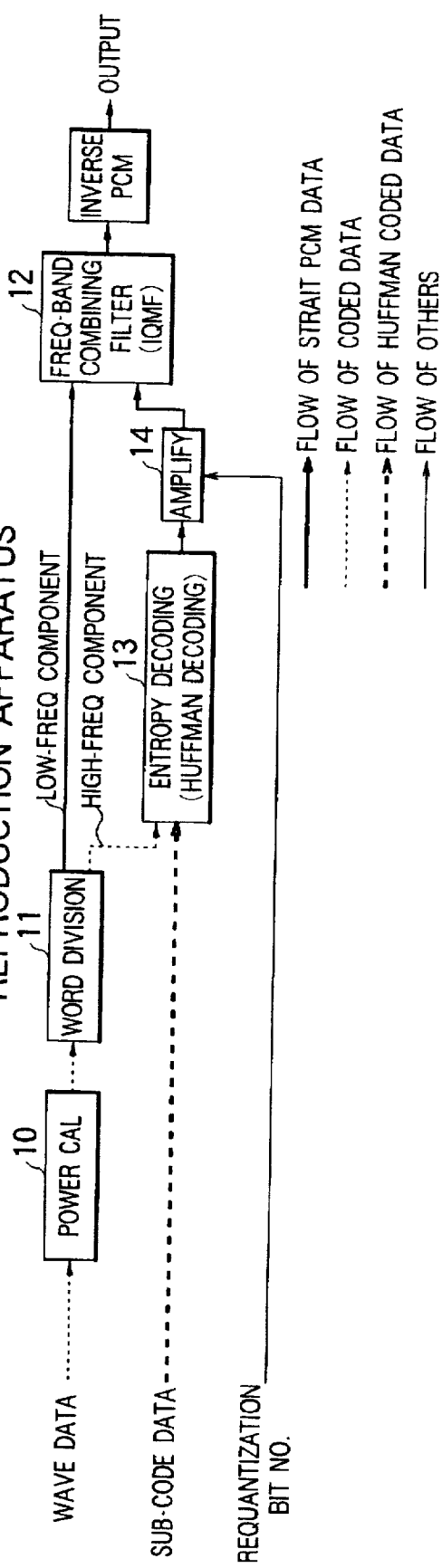

☐ STRAIGHT PCM WORDS (LOW BAND REGION)
▨ CODED DATA WORDS (HIGH BAND REGION)
] ORIGINAL STRAIGHT PCM WORDS (LOW BAND REGION)

RECORDING

REPRODUCTION

REQUANTIZED TO 7 BITS

8 BITS

16 BITS

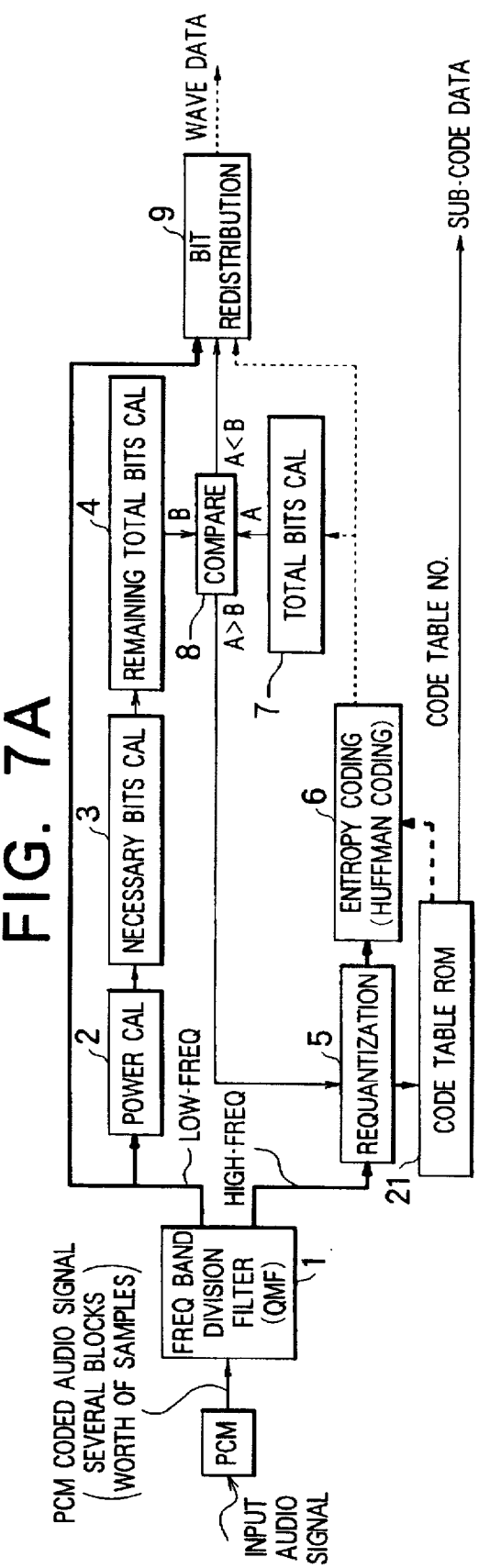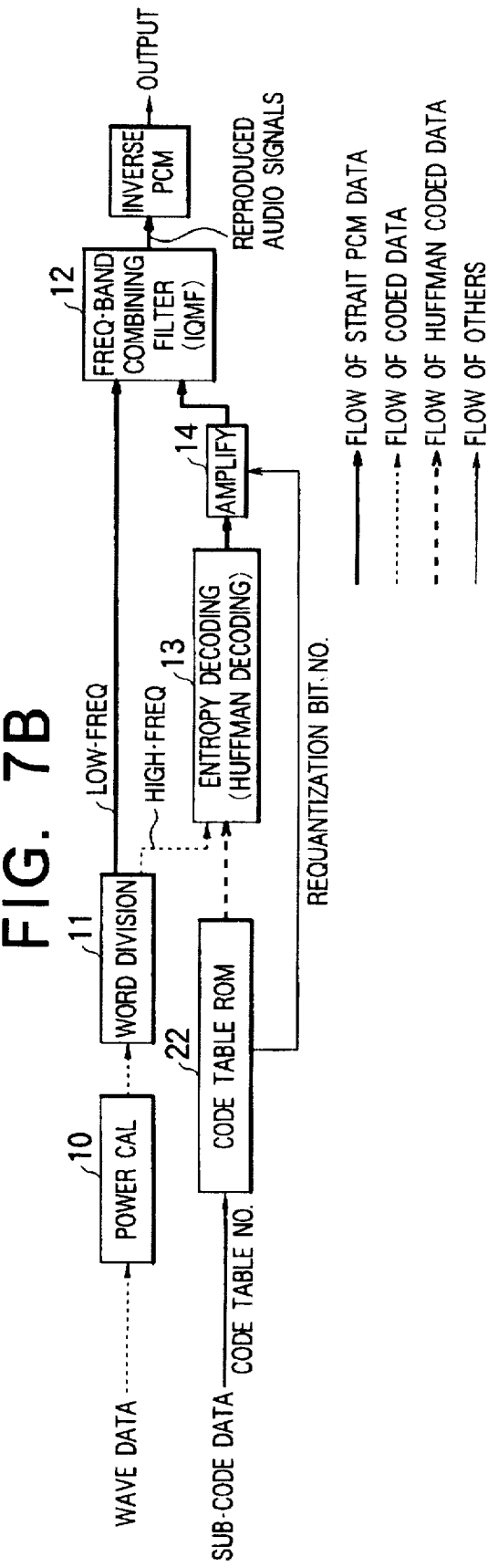

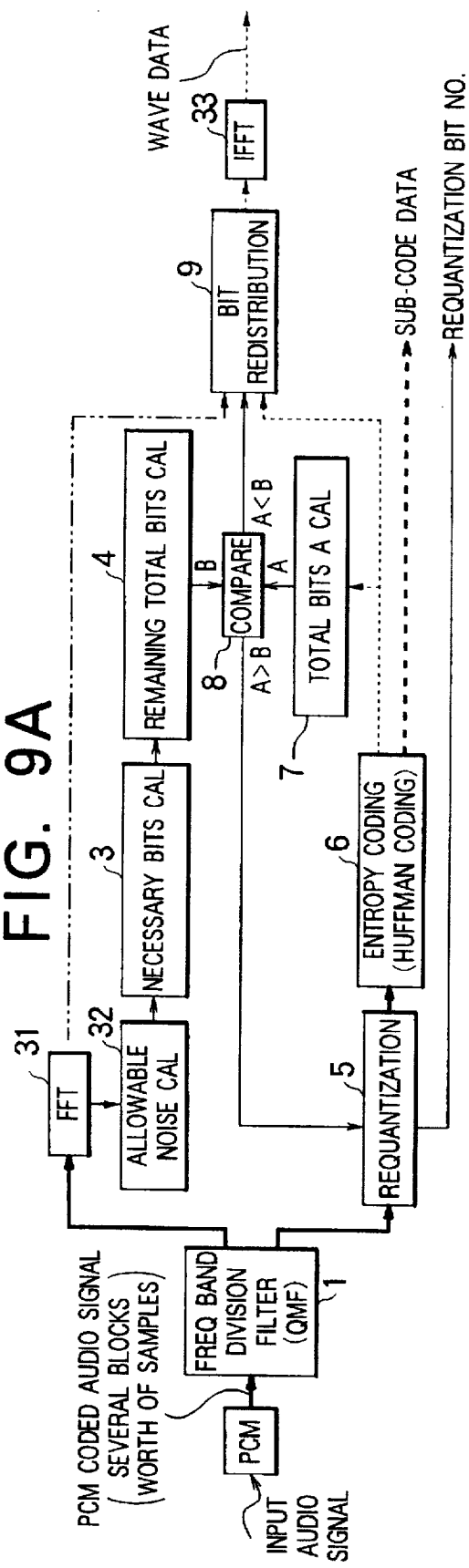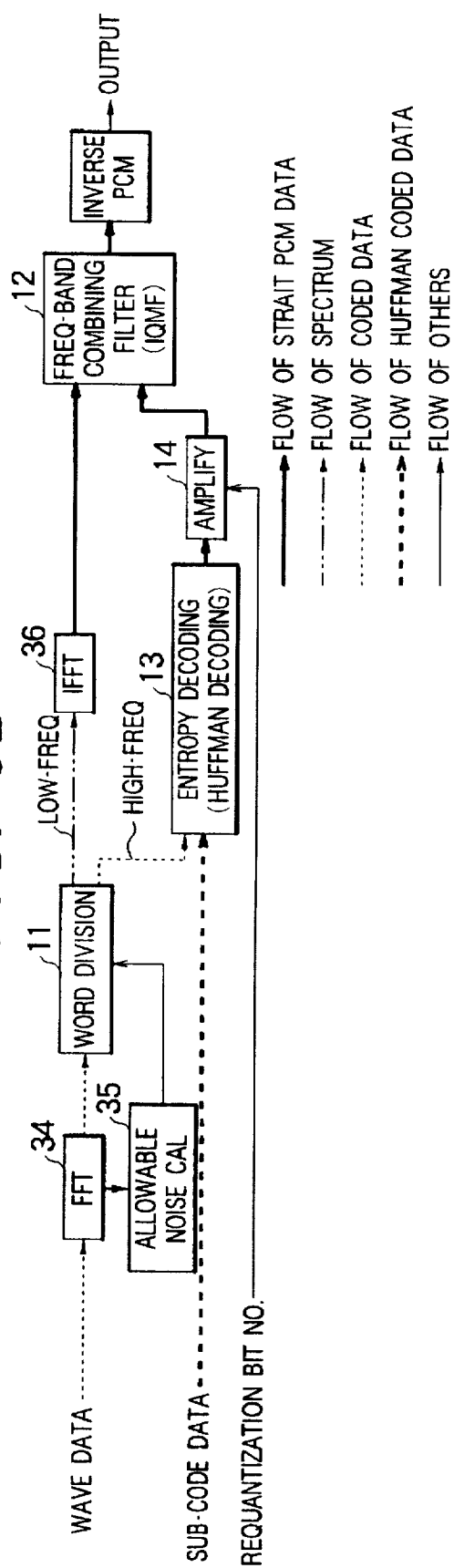
FIG. 9A
FIG. 9B

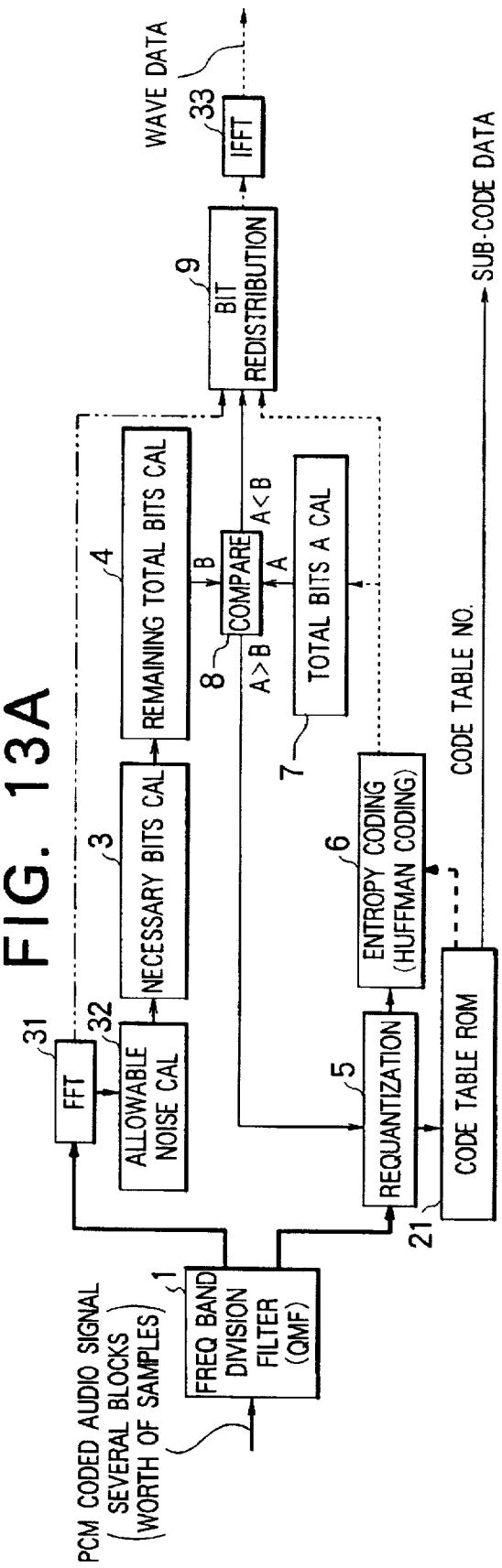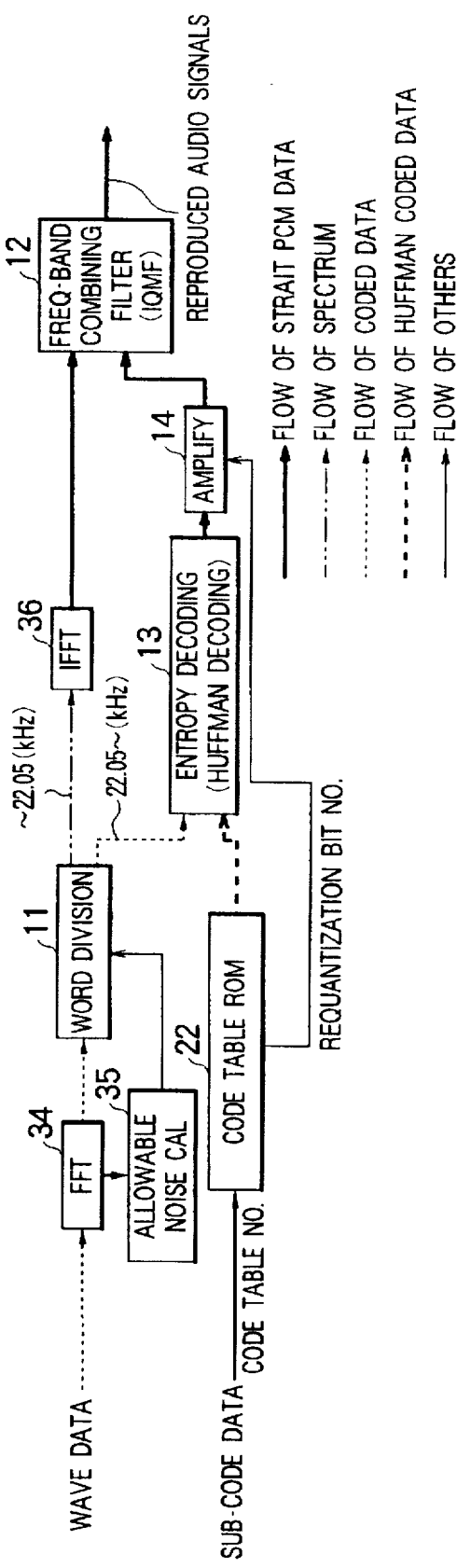

5,687,157

METHOD OF RECORDING AND REPRODUCING DIGITAL AUDIO SIGNAL AND APPARATUS THEREOF

BACKGROUND OF THE INVENTION

1. Field of the Invention

The present invention relates to a method of reproducing a digital audio signal on a recording media and reproducing the same from the recording media, and an apparatus thereof. More particularly, the present invention relates to a method for coding a digital audio signal, a method of decoding a coded audio signal, an apparatus for working these methods, and media used for the same.

Specifically, the present invention relates to a method and apparatus which, when coding and recording on a recording medium a digital audio signal of a broad frequency band, code an audio signal component of a certain frequency band in a manner reproducible by an existing reproduction apparatus, perform high efficiency coding on the other frequency components, and then record them on the recording medium and to a medium. The present invention also relates apparatus for reproducing the same from the recording medium.

Further, specifically, the present invention relates to a method and apparatus which, when coding and transmitting through a transmission channel a digital audio signal of a broad frequency band, code an audio signal component of a certain frequency band in a manner reproducible by an existing reproduction apparatus, perform high efficiency coding on the other frequency components, and then transmit them through the transmission channel and to a method and apparatus for reproduction after receiving the transmitted signals.

2. Description of the Related Art

Here, an example will be described of a compact disk (CD) recording and reproduction apparatus for recording and reproducing digital audio signals on and from a CD.

At the present time, the sampling frequency used for signal processing in CD recording and reproduction apparatuses is 44.1 kHz. The maximum reproduction frequency is half of that frequency, that is, 22.05 kHz. The frequency band audible to the human ear is said to be within the range of 16 Hz to 20 kHz. Normally, it is sufficient to record ordinary sounds on a CD in this frequency range and then reproduce them from the CD.

However, sometimes the above frequency range is insufficient. For example, sounds such as a "gamelan", the Indonesian instrumental orchestra, or "yodeling", the singing of the European Alps, include a signal component of a frequency band exceeding 20 kHz, which higher sounds can be heard. Therefore, when coding and recording on a CD sound including high frequency band sound such as a gamelan or sound of a broad frequency band and when reproducing the same from a CD, it is not possible to accurately code and record on a CD such sound including the high frequency band signal component or to reproduce the same from a CD with a sampling frequency of 44.1 kHz (maximum reproduction frequency of 22.05 kHz). Such problems relating to the frequency band are not unsolvable with application of modern electronics technology. Proposals for solving them are illustrated below.

For example, giving due consideration to dimensional compatibility with existing CDS and CD reproduction apparatuses, it is possible to substantially raise the storage capacity of the CD by the amount of the broader frequency band without changing the size of the CD. For realizing this, it is considered to make the sampling frequency higher, the track pitch of the CD smaller, and use short wavelength lasers for the light source of the pickup. Making the sampling frequency about two times higher is easy from the viewpoint of recent modern technology. The track pitch of CDs can also be made narrower to a certain extent. Various other proposals may also be considered.

If the above-mentioned proposals are adopted, however, it becomes necessary to change the design of the CD recording and reproduction apparatus and change the format of the CDs. This would mean a loss of compatibility with the huge number of CD reproduction apparatuses already on the market and, as a result, would create confusion in the software market.

Accordingly, while possible as methods for solving the above problems from the standpoint of just the current level of technology, the proposals cannot be adopted as they would throw the existing order of things into disarray. That is, to solve the above problems, it is necessary to give consideration to the usefulness and compatibility of existing apparatuses and maintain the standard (format) of the CDs themselves.

In the above description, illustration was made of a CD as the recording medium and a reproduction apparatus for the same, but the invention is not limited to this. Problems similar to the above occur in other recording media and apparatuses for digitally recording an audio signal of a very broad frequency band. As such recording media and apparatuses, there are for example laser disks (LD) recording both video signals and audio signals and reproduction apparatuses for the same, digital audio tape apparatuses (DAT) and magnetic tape used for the same, and video tape reproduction apparatuses (VTRs) recording video signals and audio signals and the magnetic tape used for the same (video tape).

Further, the invention is not limited to recording on and reproducing from a recording medium. Problems similar to the above are encountered even when coding and transmitting digital audio signals of a broad frequency band and reproducing them on the receiving side.

SUMMARY OF THE INVENTION

An object of the present invention is to provide a method and apparatus enabling reliable coding and decoding of digital audio signals of a broad band while maintaining compatibility and usefulness with respect to the standards (format) of existing media and existing signal reproduction apparatuses.

Another object of the present invention is to provide a recording medium for use in the above apparatus.

According to the present invention, there is provided a digital audio signal recording apparatus including:

a frequency band dividing means for dividing an input digital audio signal into a low frequency band having a plurality of first signal components which include subfrequency band information and a high frequency band having a plurality of second signal components which include subfrequency band information, a first coding means for coding said first signal components of said low frequency band using a coding process compatible with conventional CD reproduction methods to produce a first result of coding, a second coding means for coding the second signal components using a high efficiency coding to produce a second result of coding, and an integrating and recording means for integrating said first result of coding and said second result of coding and recording the result on a recording medium.

Preferably, said frequency band dividing means performs preliminary processing to reduce the auditory effects of quantization noise before the frequency band division.

Specifically, the frequency band dividing means has a frequency band division filter such as a QMF, CQF, or equal bandwidth filter.

Preferably, the input digital audio signal is expressed as words. Preferably, the first coding means codes the plurality of sub-frequency band information obtained by dividing the entire band of the input audio signals using a plurality of sub-words obtained by dividing the words expressing the digital audio signals.

Further, preferably, the input digital audio signal is processed in units of a plurality of words of a plurality of blocks, each block being comprised of a plurality of words.

Preferably, the first coding means comprises
a coding means for coding the first frequency band signal components to produce the first result of coding,
a word dividing means for dividing words based on values indicating the extent of coding for said first frequency band signal components,
a means for calculating a first number of bits necessary for coding the first frequency band signal components based on said calculated value, and
a remaining total bit calculating means for calculating the remaining total number of bits for a predetermined bit length.

Specifically, the first coding means performs straight PCM modulation.

Preferably, the word dividing means divides words in a time domain or divides words in a frequency domain.

When dividing words in a time domain, preferably, said word dividing means comprises a circuit for calculating an allowable noise level of the first frequency band signal components and a circuit for dividing words for each sample by a certain rate in accordance with the calculated noise level, or the word dividing means comprises of a circuit for calculating an allowable noise level of the first frequency band signal components and a circuit for dividing words in an average fashion in accordance with the calculated noise level for the plurality of words of a unit of audio signals which have been input.

Preferably, the circuit for calculating an allowable noise level of the word dividing means calculates the power, maximum amplitude, or average value of said first band signal component as a parameter expressing the allowable noise level.

Preferably, the second modulating means comprises
a requantizing means for quantizing the second frequency band signal components within a predetermined number of bits to produce requantized data,
a coding means for performing high efficiency coding on the requantized data to produce the second result of coding,
a means for calculating a second number of bits expressing the number of bits subjected to the high efficiency coding, and
a comparing means for comparing the second number of bits and the first number of bits and, when the second number of bits is larger than the first number of bits, further reducing the number of quantization bits in the requantizing means and then having the requantizing means perform requantization, wherein the requantizing means responds to an instruction of the comparing means, reduces the number of bits further, performs requantization, and sends the result to the coding means, and wherein the integrating and recording means redistributes the bits of the first result of coding and the second result of coding using the first number of bits and second number of bits.

Preferably, the coding means in the second coding means performs high efficiency coding on at least one sub-frequency band information of the remaining high frequency band signal components by the distributed sub-words.

The high efficiency coding includes:

(1) entropy coding on the sub-frequency band information to be coded, (2) nonlinear quantization on the sub-frequency band information to be coded, (3) linear quantization on the sub-frequency band information to be coded, and (4) vector quantization on the sub-frequency band information to be coded.

Preferably, the integrating and recording means records on the recording medium along with the sub-words information expressing by which of straight PCM or high efficiency coding the sub-frequency band information was coded.

Specifically, the recording medium is a recording medium such as a compact disk, laser disk, and magnetic tape.

When dividing words in the frequency domain, preferably the word dividing means comprises
a means for converting the first frequency band signal components into a frequency domain, a circuit for calculating an allowable noise level of the signal components of the frequency domain, a circuit for dividing words for each sample by a rate in accordance with the calculated noise level, and a frequency and time domain converting means which is provided after the bit redistributing portion of the integrating and recording for restoring the frequency region signal components to time domain signal components, or the word dividing means comprises
a means for converting the first frequency band signal components into a frequency domain, a circuit for calculating an allowable noise level of the signal components of the frequency domain, a circuit for dividing words in an average fashion in accordance with the calculated noise level for the plurality of words of a unit of audio signals which have been input, and a frequency and time domain converting means which is provided after the bit redistributing means for restoring the frequency domain signal components to time domain signal components.

Specifically, the means for converting the time-base region signal component to a frequency domain signal component has a fast Fourier transform circuit, and the means for converting a frequency domain signal component to a time domain signal component has an inverse fast Fourier transform circuit.

According to the present invention, further, there is provided a digital audio signal reproduction apparatus comprising
a means for reading recorded information from a recording medium on which is recorded a digital audio signal obtained by dividing a digital audio signal of a plurality of block units into signal components of a plurality of frequency bands, including at least one frequency band for reproduction by an existing reproduction method, and modulating the same, a first decoding means for decoding the signal component obtained by modulating the signal component of a frequency band reproducible by an existing reproduction method among the information which is read out, a second decoding means for decoding the signal components of the remaining divided frequency bands obtained by high efficiency coding among the information which is read out, and a combining means for combining the result of decoding by the first decoding means and the result of decoding by the second decoding means to produce audio signals.

Preferably, the reading means reads at a speed higher than the existing reading speed when reading and reproducing recorded information from the recording medium.

According to the present invention, there is further provided a digital audio signal processing system comprising a transmission channel, a first digital audio signal processing apparatus, said apparatus comprising a frequency band dividing means for dividing an input digital audio signal into signal components of a plurality of sub-frequency bands including at least one signal component of a first frequency band for reproduction by an existing reproduction method, a first coding means for coding the signal component of the first frequency band by a method conforming with the existing reproduction method to produce a first result of coding, a second coding means for coding a signal component of a remaining second frequency band obtained by division other than the first frequency band based on high efficiency coding to produce a second result of coding, and an integrating and recording means for integrating the first result of coding and the second result of coding and recording the result of that on a recording medium, and a second digital audio signal processing apparatus connected to the first digital audio signal processing apparatus through the transmission channel, said apparatus comprising a means for reading recorded information from a recording medium on which is recorded a digital audio signal obtained by dividing digital audio signals of a plurality of block units into signal components of a plurality of frequency bands, including at least one frequency band for reproduction by an existing reproduction method, and coding the same, a first decoding means for decoding the signal component obtained by coding the signal component of a frequency band reproducible by an existing reproduction method among the information which is read out, a second decoding means for decoding the signal components of the remaining divided frequency bands obtained by high efficiency coding among the information which is read out, and a combining means for combining the result of decoding by the first decoding means and the result of decoding by the second decoding means to produce audio signals.

Illustration will be made here of a CD audio signal recording and reproduction apparatus.

In the present invention, when recording a digital audio signal having a broad frequency band, the audio signal component is divided into two; into, for example, a high frequency band signal component and a low frequency band signal component.

Signals of at least one frequency band from the low frequency band signal component are processed by an existing coding (modulation) system, for example, straight pulse coded modulation (PCM) so as to maintain the usefulness of existing reproduction apparatuses and compatibility with existing CDs. Signals of at least one frequency band from the high frequency band signal component are coded using high efficiency coding. These are recorded on the recording medium, that is, the CD.

That is, in the present invention, the low frequency band signal reproduced by conventional CDs is subjected to straight PCM while the higher frequency band signal is stored in the storage capacity of the CDs using high efficiency coding.

Explaining this more specifically, in the present invention, (1) The broad frequency band signals are divided into at least two sub-frequency band regions using a QMF (quadrature mirror filter) or other frequency band division filter, (2) At least one frequency band from the low frequency band signal component is subjected to straight PCM, (3) At least one frequency band from the high frequency band signal component is subjected to entropy coding, nonlinear quantization, or other high efficiency coding, and (4) The straight PCM words are divided by the number of bits giving auditory redundancy to allocate the respective frequency band signals.

At this time, the straight PCM portion ends up becoming shorter than the original PCM words, so it is desirable to use noise shaping technology to realize an S/N ratio corresponding to the original PCM word length.

The present invention in this way codes the high frequency band signal component as well along with the low frequency band signal component while striving to compress the amount of information as a whole and maintaining the sound quality of the low frequency band signal component.

BRIEF DESCRIPTION OF THE DRAWINGS

The above and other objects and features of the present invention will be apparent more in detail with reference to the accompanying drawings, in which;

FIGS. 1A and 1B are views of the configuration of the main parts of a CD digital audio signal processing apparatus according to a first embodiment of the digital audio signal processing apparatus of the present invention, wherein FIG. 1A is a view of the configuration of a CD digital audio signal recording apparatus and FIG. 1B is a view of the configuration of a CD digital audio signal reproduction apparatus;

FIGS. 2A to 2C are views showing the data format of a CD used in the CD digital audio signal recording and reproduction apparatus illustrated in FIG. 1A and FIG. 1B, wherein FIG. 2A shows the block configuration, FIG. 2B shows the configuration of a frame in a block, and FIG. 2C shows the configuration of sub-codes in a frames FIG. 3A and 3B are graphs showing the word division in the straight PCM processing of FIG. 1A, wherein FIG. 3A is a graph illustrating an example of division of words for each sample and FIG. 3B is a graph illustrating an example of division of words in an average fashion in accordance with the power of each units FIGS. 4A and 4B are views showing the state of use of 16-bit words, wherein FIG. 4A shows the configuration of a word at the time of recording and FIG. 4B shows the configuration of a word at the time of reproductions

FIGS. 6A to 6C are graphs illustrating the interrelation of requantization processing and the extent of quantization at different bit lengths, wherein FIG. 6A is a graph illustrating the state of 16-bit requantization, FIG. 6B is a graph illustrating the state of 8-bit requantization, and FIG. 6C is a graph illustrating the state of 7-bit requantization;

FIGS. 7A and 7B are views of the configuration of the main parts of a CD digital audio signal processing apparatus according to a second embodiment of the digital audio signal processing apparatus of the present invention, wherein FIG. 7A is a view of the configuration of a CD digital audio signal recording apparatus and FIG. 7B is a view of the configuration of a CD digital audio signal reproduction apparatus;

FIGS. 9A and 9B are views of the configuration of main parts of a CD digital audio signal processing apparatus according to a third embodiment of the digital audio signal processing apparatus of the present invention, wherein FIG. 9A is a view of the configuration of a CD digital audio signal recording apparatus and FIG. 9B is a view of the configuration of a CD digital audio signal reproduction apparatus;

FIG. 13A and 13B are views of the configuration of main parts of a CD digital audio signal processing apparatus according to a fourth embodiment of the digital audio signal processing apparatus of the present invention, wherein FIG. 13A is a view of the configuration of a CD digital audio signal recording apparatus and FIG. 13B is a view of the configuration of a CD digital audio signal reproduction apparatus.

DESCRIPTION OF THE PREFERRED EMBODIMENTS

First Embodiment

Figure 2A:
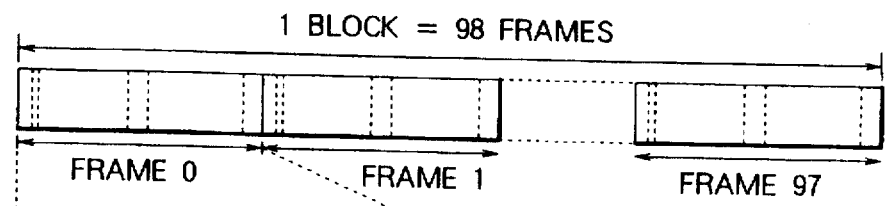

As a first embodiment of a digital audio signal processing apparatus of the present invention, illustration is made of a CD digital audio signal recording and reproduction apparatus (hereinafter referred to as a "CD recording and reproduction apparatus") which uses a CD (compact disk) as a recording medium and acts as a signal processing apparatus to record audio signals on the CD and reproduce audio signals from the CD.

FIGS. 1A and 1B are views of the configuration of main parts of the CD recording and reproduction apparatus. FIG. 1A is a view of the configuration of a CD digital audio signal recording apparatus (hereinafter referred to as a "CD recording apparatus") and FIG. 1B is a view of the configuration of a CD digital audio signal reproduction apparatus (hereinafter referred to as a "CD reproduction apparatus").

The CD recording apparatus illustrated in FIG. 1A is comprised of a frequency band division filter 1, a power calculation circuit 2, a necessary bit calculation circuit 3, a remaining total bit calculation circuit a, a requantization circuit 5, an entropy coding circuit 6, a total bit calculation circuit 7, a comparison circuit 8, and a bit redistribution circuit 9.

The thick solid line shows the flow of straight PCM. Accordingly, in the flow, provision is made of a first coding circuit (not shown) for straight PCM. The low frequency band audio signal component obtained by division by the frequency band division filter i is subjected to straight PCM by the not shown first coding circuit. This straight PCM data is then judged as the extent of the straight PCM modulation considering the allowable noise level by the power calculation circuit 2, the necessary bit calculation circuit 3, and the remaining total bit calculation circuit 4.

The thick broken line shows the flow of the high efficiency coded data, the thin broken line shows the flow of the Huffman codes, and the thin solid line shows the flow of number of requantization bits and other data.

The high frequency band audio signal component, obtained by division at the frequency band division filter 1, is subjected to high efficiency coding by the requantization circuit 5, the entropy coding circuit 6, and the total bit calculation circuit 7.

The coded data are subjected to bit redistribution by the bit redistribution circuit 9 and then output as the audio wave data. Further, the number of requantization bits is output from the requantization circuit 5 and the sub-code data is output from the entropy coding circuit 6. These data are recorded on the CD (not shown).

The digital audio signals recorded on the CD are reproduced by a CD reproduction apparatus.

In the CD reproduction apparatus illustrated in FIG. 1B, the wave data read from the CD are subjected to word division by the system of the power calculation circuit 10 and word division circuit 11. Decoding corresponding to the straight PCM is performed at the line shown by the thick, solid line and the low frequency band component of the audio signals is decoded by straight PCM. Accordingly, a straight PCM decoding circuit (not shown) is provided at the thick, solid line.

Further, the sub-code and number of requantization bits read from the CD are used to decode the high frequency band component by an entropy decoding circuit 13 and amplification circuit 14.

These decoded data are combined at the frequency band combining filter 12 to reproduce the original audio signals.

The frequency band combining filter 12 is reverse in circuitry to the frequency band division filter 1. FIG. 1A and FIG. 1B illustrate the signal processing system constituting the theme of the present invention. Portions not directly related to the present invention are not illustrated.

Further, FIG. 1A and FIG. 1B illustrate hardware configurations, that is, a CD recording apparatus and a CD reproduction apparatus, but these hardware configurations also show the method of signal processing.

CD Recording Apparatus

Details of the operation of the CD recording apparatus illustrated in FIG. 1A will be explained below.

The sampling frequency used in existing CD reproduction apparatuses is 44.1 kHz, but the sampling frequency Used in the CD recording and reproduction apparatus of this embodiment is 88.2 kHz, that is, a frequency twice the sampling frequency of the existing CD reproduction apparatuses. Accordingly, the maximum reproduction frequency in this embodiment is 44.1 kHz under the sampling theorem.

The input terminal of the frequency band division filter 1 is supplied with audio signals of less than 22.05 kHz, which are the subject of reproduction by existing CD reproduction apparatuses, of course, and also audio signals of a broad frequency band exceeding 22.05 kHz such as with gamelan and yodeling.

The frequency band division filter 1 outputs the input audio signals divided into signal components of two frequency bands, that is, a low frequency band signal component and high frequency band signal component. The low frequency band signal component consists of signals of a frequency band of 0 Hz to 22.05 kHz and can be processed by existing CD reproduction apparatuses. The high frequency band signal component consists of signals of a frequency band of 22.05 to 44.1 kHz. The high frequency band component cannot be processed by existing CD reproduction apparatuses.

The low frequency band component signals separated at the frequency band division filter 1 are processed through the line of the power calculation circuit 2, necessary bit calculation circuit 3, and remaining total bit calculation circuit 4.

The high frequency band component signals separated at the frequency band division filter 1 are processed by high efficiency coding through the line of the requantization circuit 5, entropy coding circuit 6, and total bit calculation circuit 7.

The audio signals processed by straight PCM and the audio signals processed by high efficiency coding are distributed at the bit redistribution circuit 9 and recorded as wave data on a CD. The sub-codes output from the entropy coding circuit 6 and the number of requantization bits output from the requantization circuit 5 also also recorded on the CD for reproduction in the CD reproduction apparatus.

CD Reproduction Apparatus

The operation of the CD reproduction apparatus illustrated in FIG. 1B will be explained next.

The CD reproduction apparatus reproduces the original audio data using the wave data, sub-code data, and number of requantization bits from the CD on which various kinds of data are recorded in this way. The decoding in the CD reproduction apparatus is reverse to the coding in the CD recording apparatus. That is, the low frequency band component signals are reproduced from the wave data at the power calculation circuit 10 and word division circuit 11, and the high frequency band component signals are reproduced using the sub-code data and the number of requantization bits at the entropy decoding circuit 13 and amplification circuit 14. The frequency band combining filter 12 combines these reproduced signals.

CD Recording and Reproduction Apparatus

The operation of the CD recording apparatus and the CD reproduction apparatus will be explained in more detail below.

Figure 2B:
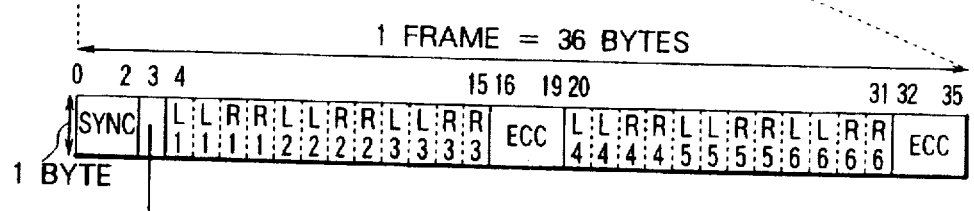
Figure 2C:
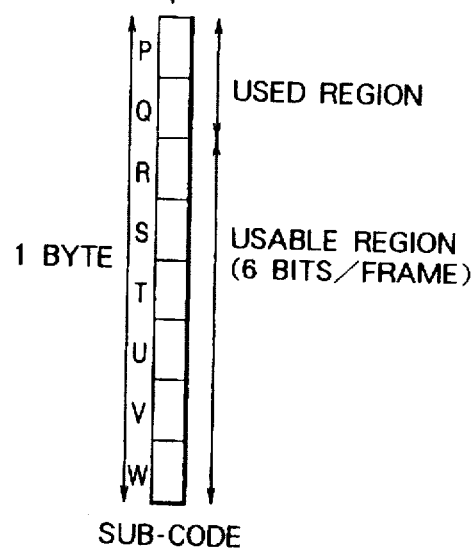

FIGS. 2A to 2C are views of the data format of the CD used in the CD recording and reproduction apparatus illustrated in FIG. 1A and FIG. 1B. FIG. 2A shows the configuration of a block of the audio signals, FIG. 2B shows the configuration of one frame in a block, and FIG. 2C shows the configuration of a sub-code area in a frame.

The CD format consists of a plurality of blocks each of which consists of 98 frames, and each frame consists of 36 bytes. The basic unit is 6 samples/channel. The front two frames are used as sub-code synchronization signals, so the number of samples in one block equals (98-2) frames×6 samples/channel=576 samples/channel.

The sub-code area is divided into a used area (P,Q) and a usable area (R to W), that is, is provided with a sub-code P showing the position of the start of a song, a sub-code Q for giving a higher function such as the number of channels of recorded songs and the existence of pre-emphasis, and the sub-codes R to W. The sub-codes R to W are called "user's bits". These sub-codes R to W may be used by the users for control signals etc. In the present invention, however, information for high efficiency coding is inserted into the usable area. Details will be given later.

Entropy coding in the entropy coding circuit 6 is coding of an information storage type which is directed to data output having a finite number of symbols and which makes use of purely statistical characteristics, that is, utilizes the imbalance in probability of appearance to shorten the average code length by allotting shorter code words to symbols with a high frequency of occurrence. In this embodiment, as a preferred example of the entropy coding circuit 6, use is made of Huffman coding. This Huffman coding gives the optimal code allotment in the case where the statistical characteristics of the source of the information are known and performs coding recursively from the probability of appearance of symbols.

Since input data of a number of samples of a certain length is required for entropy coding in the entropy coding circuit 6, as the audio signals input to the frequency band division filter 1, in consideration too of the real time nature at the time of reproduction and the ease of reading data, the signals are input in units of a plurality of blocks, for example, four to eight blocks or 80.

The input audio signals are input to the frequency band division filter 1 where they are divided into a high frequency band signal component and low frequency band signal component. As a preferred example of a frequency band division filter in this embodiment, use is made of a QMF (quadrature mirror filter). Details of a QMF are discussed, for example, in 1976 R. E. Crochiere, "Digital coding of speech in subbands", Bell Syst. Tech. J., Vol. 55, No. 8, 1976.

As preliminary processing for the division filter processing of the frequency band division filter 1, the audio effects of quantization noise of the low frequency band signal component are reduced. This preliminary processing is performed with the object of preventing degradation of the auditory sound quality as much as possible when performing recording, reproduction, transmission, etc. with limited word lengths (symbols). As one method for changing the spectrum of quantization noise to match the auditory characteristics, there is known "SBM" (super bit mapping) which makes use of noise-shaping technology. SBM is for example discussed in detail in U.S. Pat. No. 5,204,677.

The QMF in the frequency band division filter 1 divides the frequency band of the input audio signals into two equal parts by 22.05 kHz and outputs the number of samples decimated (reduced) to one-half. Note, using the QMF decimates the number of samples. In this embodiment, the 0 Hz to 22.05 kHz frequency band is called the low frequency band and the 22.05 to 44.1 kHz frequency band is called the high frequency band. The high frequency band side output at this time is folded with the low frequency band side signal component.

The frequency band division filter 1 is not limited to a QMF. Use may be made of the "CQF (Conjugate Quadrature Filters)" described in Mark J. T. Smith and Thomas P. Barnwell, "Exact Reconstruction Techniques for Tree-Structured Subband Coders", IEEE Trans. ASSP, Vol. ASSP-34 No. 3, Jun. 1986, pp. 434 to 441 and the "equal bandwidth filters" described in ICASSP 83, BOSTON Polyphase Quadrature Filters—A new subband coding technology, Joseph H. Rothweiler.

An explanation will next be made of the coding of the low frequency band signal component separated at the frequency band division filter 1. The low frequency band signal component is coded by straight PCM.

The power calculation circuit 2 calculates the power of the low frequency band signal component for the word division method. This calculation of power is for detection of the magnitude of the noise component. In place of the power, it is also possible to calculate the absolute value, average value, etc. Below, the explanation will be made of the case of calculation of the power.

Figure 3A:
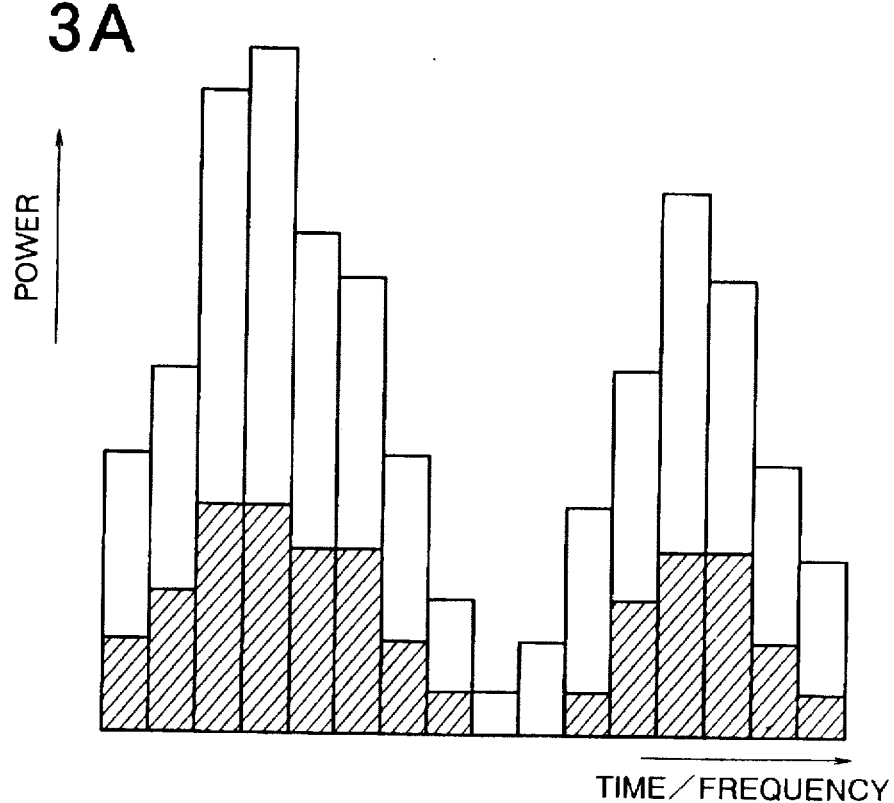
Figure 3B:
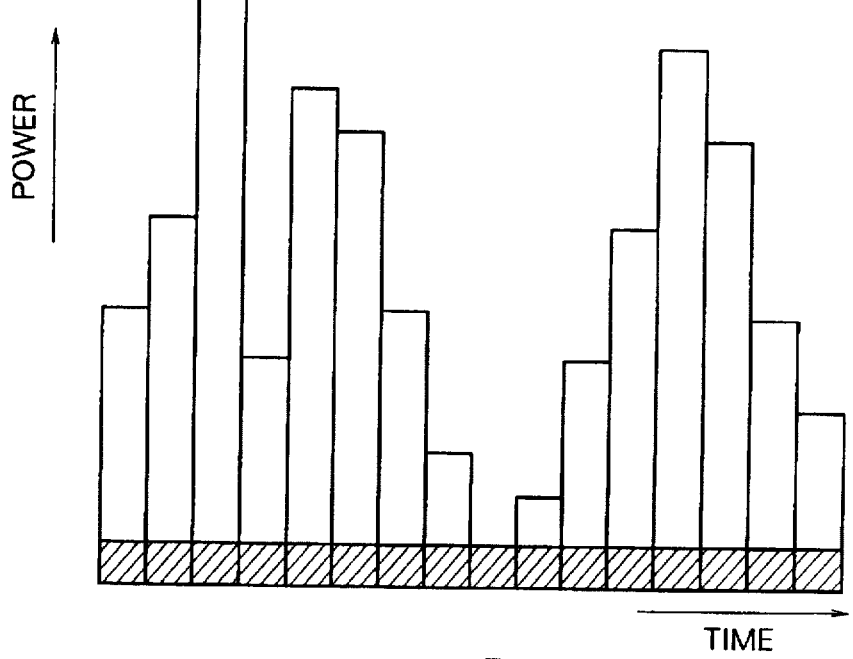

The word division, in this embodiment, includes two types, as shown in FIG. 3A and FIG. 3B. FIG. 3A and FIG. 3B are views showing the data synthesized at the bit redistribution circuit 9. The first word division, as illustrated in FIG. 3A, is a method of dividing words for each sample by a certain ratio in accordance with the power of each sample. The second word division, as illustrated in FIG. 3B, is a method of dividing words in an average fashion in accordance with the power of each unit. In FIG. 3A and FIG. 3B, the blank bars indicate straight PCM words (symbols) of the low frequency band signal component, while the matted bars indicate the coded data words (entropy coded data words) of the high frequency band signal component.

These two word division methods in the power calculation circuit 2 will be explained specifically below.

The power calculation circuit 2 calculates the power of the individual samples or units and finds to what extent the white noise level can be aurally allowed at that power, that is, up to what level degradation caused by the entry of noise cannot be felt. The correspondence of the allowable white noise level with the power of the input signals is carried out using a table stored in the power calculation circuit 2 by a table looking-up manner.

When the amplitude of the input audio signals is extremely small, almost no white noise can be allowed, but since it is anticipated that the amplitude of the high band signals will be further smaller and the sound will be even more inaudible than low frequency band signals, in this case it is possible not to code the high frequency band information.

The number of quantization bits of a CD is 16 bits. That is, one word is equal to 16 bits. The dynamic range is about 98 dB. The value of a word is expressed by 2-complement notation.

Figure 4A:
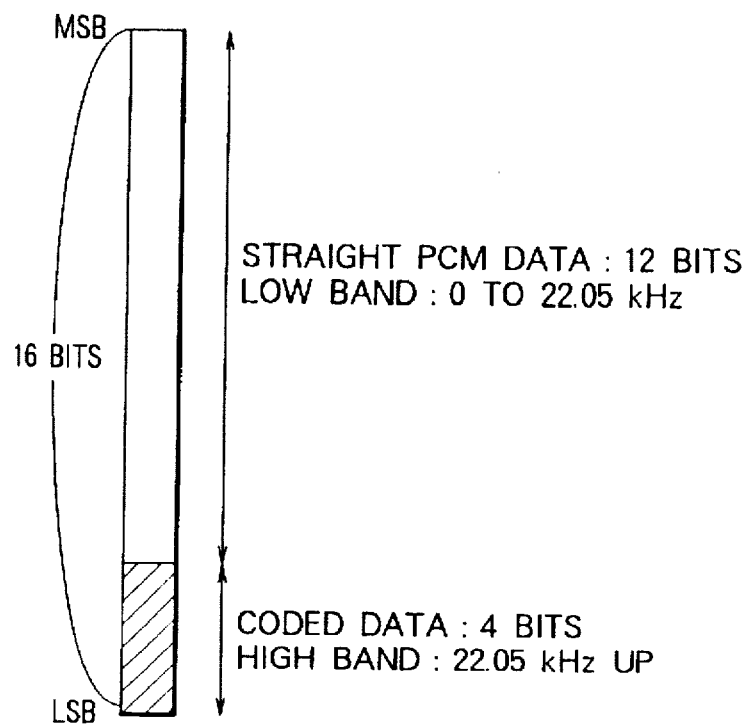
Figure 4B:
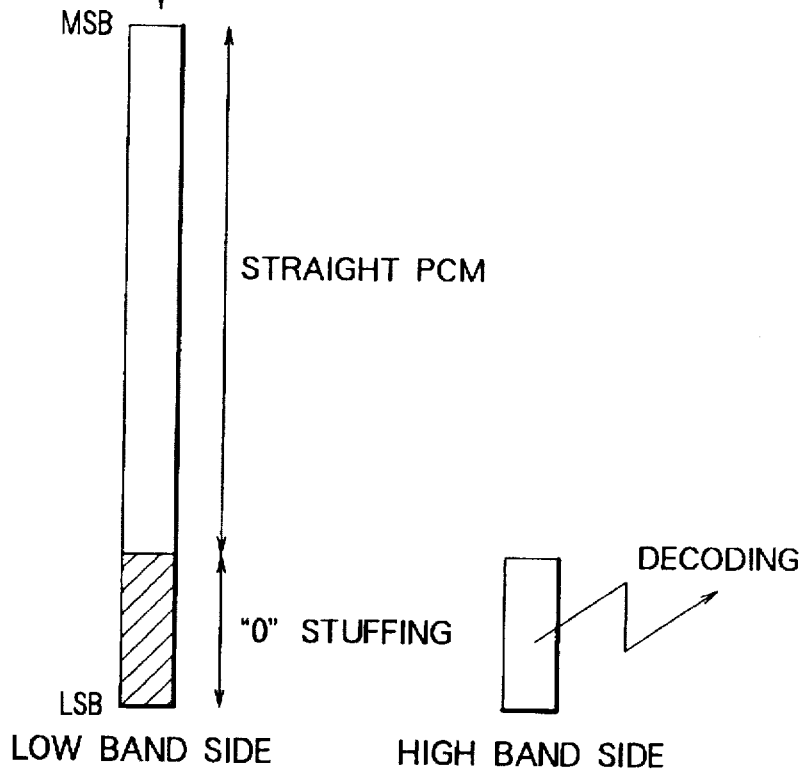

FIG. 4A and FIG. 4B are views showing the configuration of division of a 16-bit word. FIG. 4A shows the configuration of a word at the time of recording, while FIG. 4B shows the configuration of a word at the time of reproduction.

The necessary bit calculation circuit 3 restores the power calculated for each sample at the power calculation circuit 2 (FIG. 3A) or the power calculated for each unit (FIG. 3B) and calculates the "maximum allowable number of bits (word length)" by which noise cannot be aurally sensed even if superposed at the least significant bit (LSB) side of the word.

Figure 12:
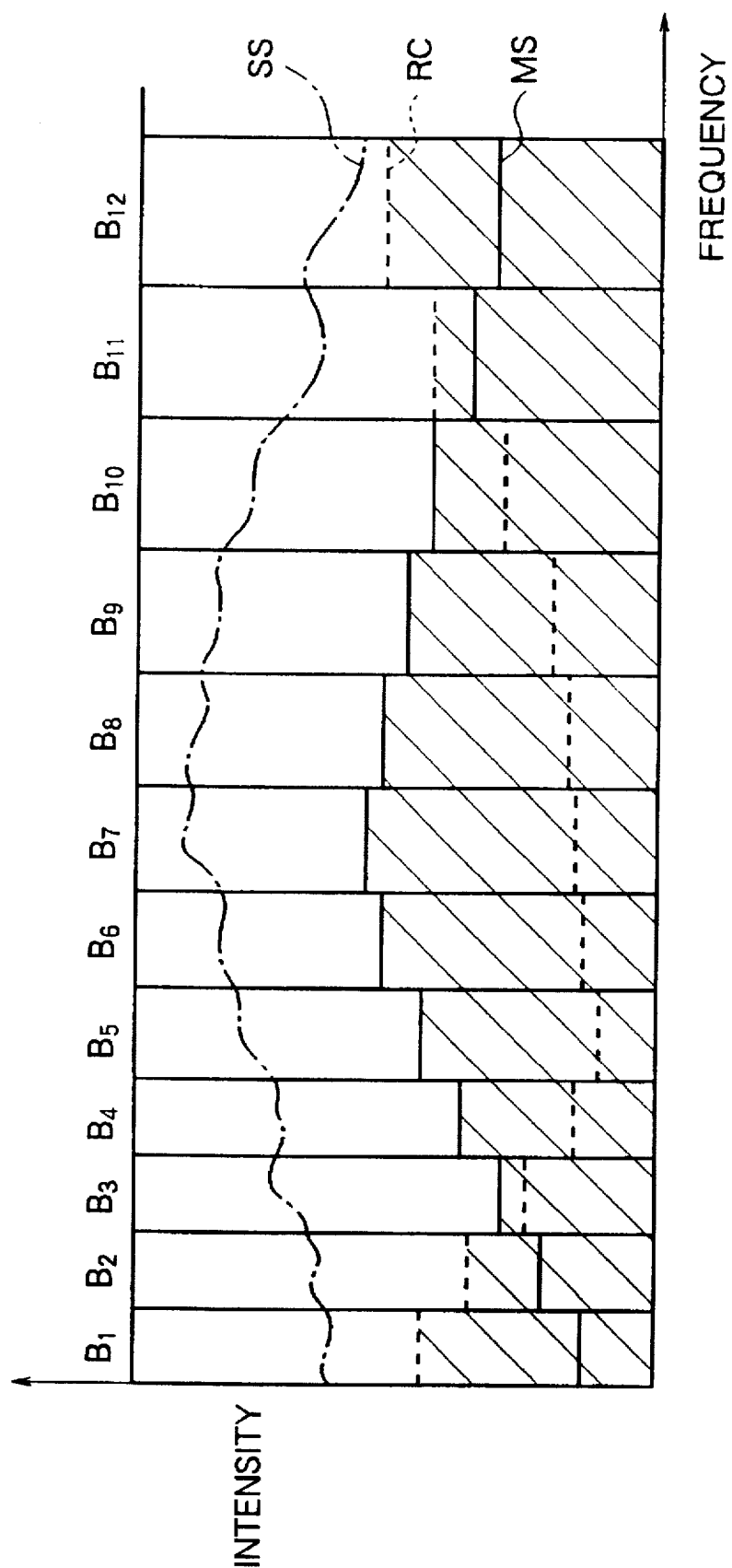
FIG. 12 is a graph showing the minimum audible curve RC, the maximum spectrum MS, and the signal spectrum SS.

The highest bit in indicating its value is called the most significant bit (MSB), while the lowest bit is called the LSB. For example, if the signal level is 0 dB and in that case white noise of up to the maximum−72 dB is allowed, at 16-bit full scale, then by conversion by approximately 6 dB per bit, noise of up to 4 bits cannot be heard aurally. Accordingly, in this case, as illustrated in FIG. 4A, 12 bits on the MSB side of a 16-bit word length are allotted at the low band signal component and 4 bits (={(16 bits×−6 dB)−(−72 dB)}/(−6 dB)) on the LSB side are allotted as the high band signal component.

A word is divided into two in time domain in this way.

The remaining total bit calculation circuit 4 totals up the "maximum allowable number of bits (word length)" calculated at the necessary bit calculation circuit 3 in units of units and calculates the number of bits B which can be allotted for recording a high band signal component in one unit (number of allottable bits B), that is, does not affect to the low frequency band signal by the allocation. The high frequency band signal component is compressed (coded) using this number of bits B as an upper boundary. Namely, the compression length is defined by (the bit number of the original signal of one sampling)−(the necessary bit number).

The high frequency band signal component is recorded by dividing the words of the low frequency band signal component.

The high frequency band signal component has a smaller signal level than the low frequency band signal component, so can be expressed by a smaller number of bits even in straight PCM.

Figure 5:
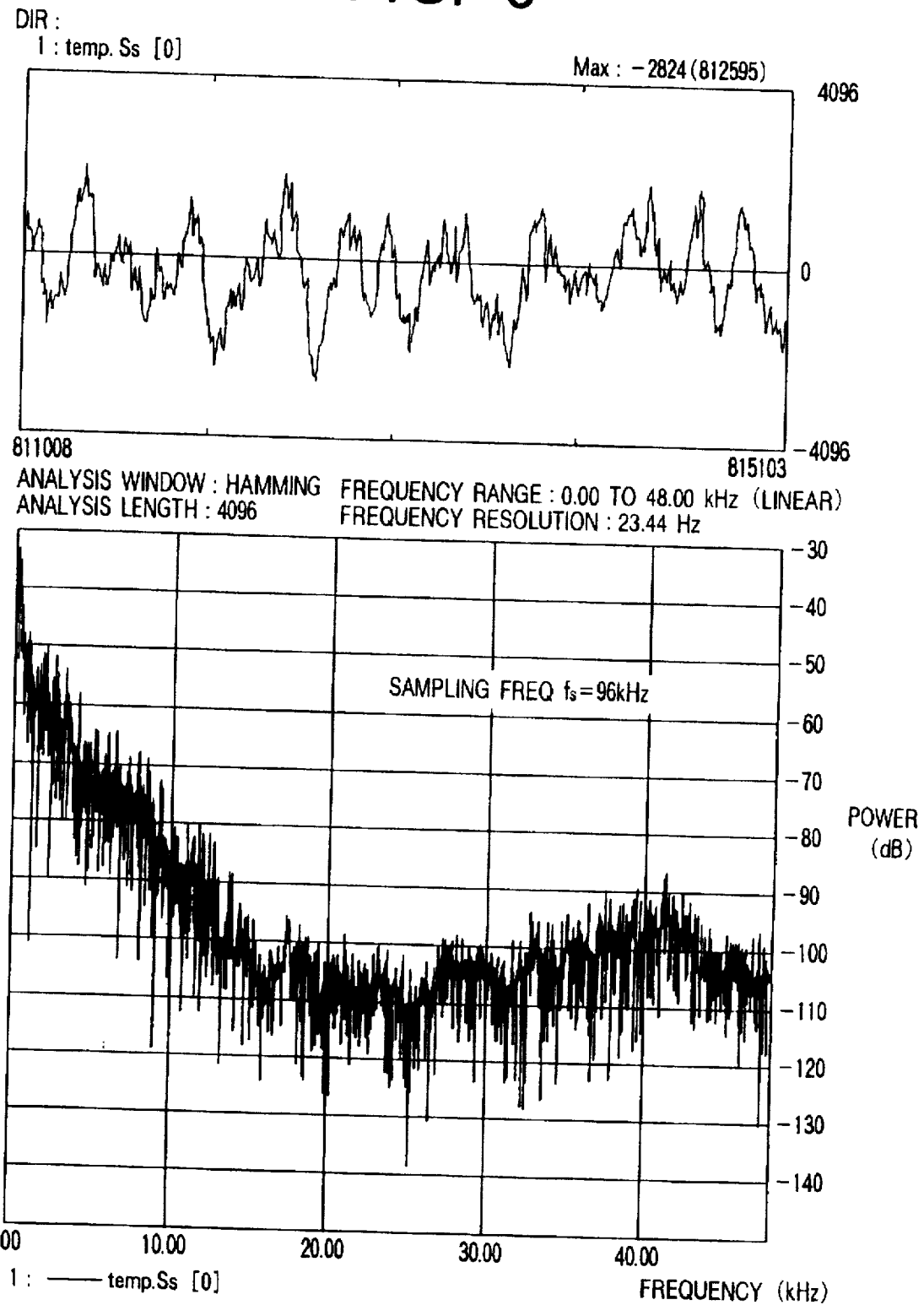
FIG. 5 is a graph showing the spectrum obtained when analyzing an actual audio signal.

The requantization circuit 5 requantizes the 16-bit data by a smaller number of bits. As shown in FIG. 5, the high frequency band signal component has a smaller power than the low frequency band signal component, so does not require 16 bits for the requantization. A number of bits of around 8 bits enables sufficient quantization (coding).

Figure 6C:
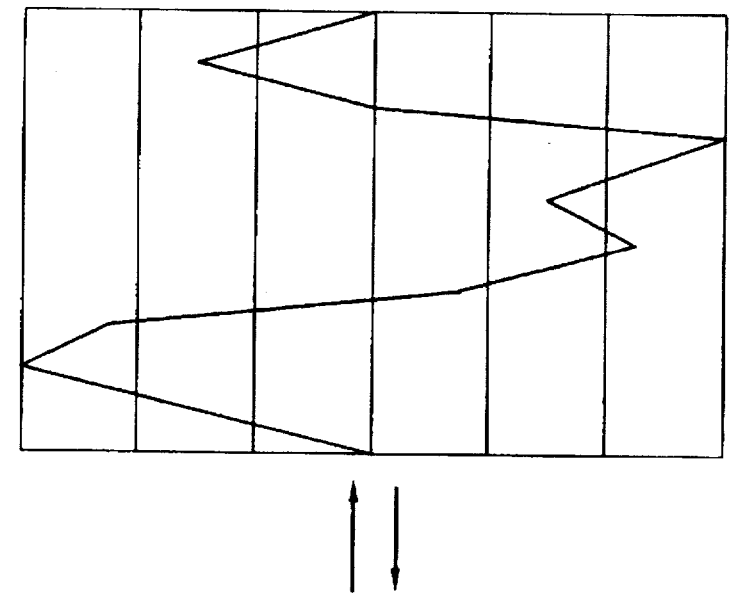
Figure 6B:
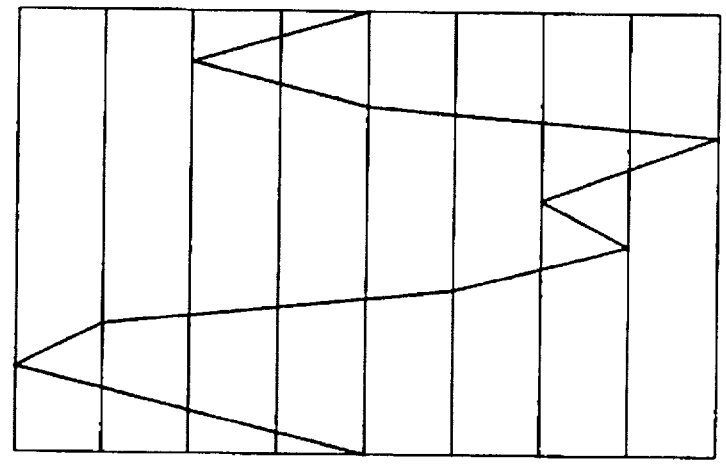
Figure 6A:
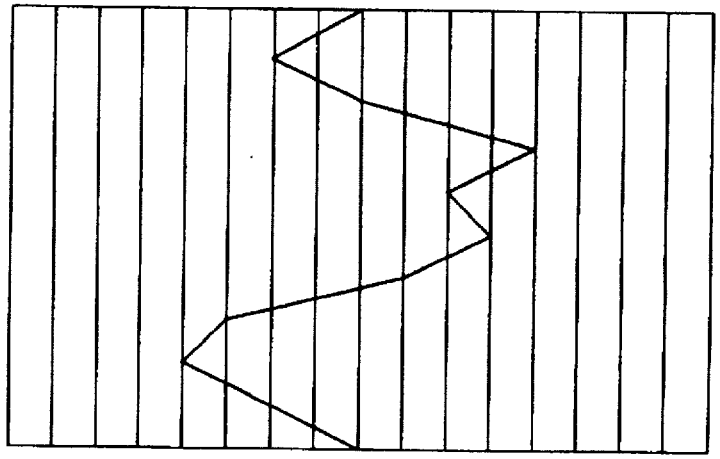

The requantization circuit 5, as illustrated in FIG. 6A and FIG. 6B, first requantizes the component by 8 bits to reduce the amount of information in the straight PCM. The "number of requantization bits" output from the requantization circuit 5 is recorded at the sub-codes R to shown in FIG. 2C.

The entropy coding circuit 6 compresses and codes the data requantized at the requantization circuit 5. In this embodiment, Huffman coding is used as the entropy coding. Entropy coding was summarized above. A summary of Huffman coding was also given above, but details are given for example in D. A. Huffman, "A Method for Construction of Minimum Redundancy Codes", Proc. I.R.E., 40, p. 1098 (1952).

The entropy coding circuit 6 has code tables allotting codes corresponding to different sample values. It uses the allotment data calculated at the remaining total bit calculation circuit 4 to code the data requantized at the requantization circuit 5 within the allotment data range.

The code tables in the entropy coding circuit 6 are prepared for each unit of processing of the input digital audio signals comprised of the plurality of blocks. The frequency of appearance of different samples values in a unit is calculated in advance and short codes are allotted to sample values with high frequencies of appearance.

As the entropy coding in the entropy coding circuit 6, use may be made, in addition to the Huffman coding, of the "Lempel-Ziv coding" described in J. Ziv, A. Lempel, "A Universal Algorithm for Sequential Data Compression", IEEE Trans. on Inform. Theory, Vol. IT-23, No. 3, pp. 337 to 343, 1977 or the coding system known as "arithmetic coding" described in F. Telinek, "Buffer Overflow in Variable Length Coding of Fixed Rate Sources", IEEE Trans. Inform. Theory, Vol. IT-14, No. 3, pp. 490 to 501, 1968. In short, instead of the entropy coding circuit 6, it is possible to use various coding methods for high efficiency coding of data requantized by the requantization circuit 5. Details will be given later.

The code tables are recorded separate from the wave data in the CD format in the sub-codes R to W shown in FIG. 2C, which are normally not used (used for graphic data in some cases).

As illustrated in FIGS. 2A to 2C, there is one byte (8 bits) per frame, so there are 98 frames×8 bits=784 bits of sub-codes per block. Among these, the sub-codes R to W are 98 frames×6 bits=588 bits. When one unit is made 068 blocks, the usable (R to W) sub-code area is 588×8 blocks=4704 bits. Even by separate channel D of L and R, the result is half, or 2352 bits, so it is fully possible to record the code tables in this sub-code area including also the number of requantization bits. Note, in this embodiment, the probability of the data generation is sequentially found in the corresponding unit, and the optimum table data is stored in the area of sub-codes R to W, and thus, the tables may be varied in response to the units.

In this example, as illustrated in FIGS. 2A to 2C, the block length of one unit, that is, the unit of processing of input digital audio signals comprised of a plurality of blocks, is fixed, but it is possible to make the block length of one unit variable and to perform coding using the block length giving the lowest entropy as the length of one unit. By doing this, it is possible to realize a higher compression rate. At this time, it is necessary to record and transmit the length of one unit. This length data is recorded in the sub-code area as well. The total bit calculation circuit 7 calculates the total (total number of bits) of the number of bits of coded data in a unit (not shown) after entropy coding in the entropy coding circuit 6.

The comparison circuit 8 compares the "maximum allowable number of allotted bits" B found by the low frequency band signal processing system comprised of the remaining total bit calculation circuit 4 and the total number of bits A of the entropy codes found by the total bit calculation circuit 7 and judges if the coded data can be recorded on the CD within the given information.

If the total number of bits A becomes larger than the number of allottable bits B, the coded data cannot all be recorded on the CD. At this time, the requantization circuit 5, as illustrated in FIG. 6C, reduces the number of quantization bits to 7 bits and performs requantization to raise the compression efficiency at the entropy coding circuit 6 and perform recording. The code tables in the entropy coding circuit 6 are updated each time and coding is performed by the optimal table.

If the total number of bits A is smaller than the number of allottable bits B, the coded data (compressed data) can be recorded on the CD, so the low band straight PCM and high frequency band coded data are subjected to the necessary bit redistribution at the bit redistribution circuit 9 and stored in the low frequency band signal storing region illustrated in FIG. 4A.

The bit redistribution circuit 9, as illustrated in FIG. 4A, distributes the low frequency band words to the LSB side and high frequency band coded data instead of the low band data.

The bit redistribution circuit 9 distributes bits and outputs the data with half the amount of information as wave data recorded on the CD. This wave data is recorded on the CD in the same way as in the past.

The CD has recorded on it not only the wave data, but also the above-mentioned number of requantization bits and sub-code data.

The detailed operation of the CD reproduction apparatus will be explained next referring to FIG. 1B.

The CD reproduction apparatus calculates the power of the wave data read from the CD by the power calculation circuit 10 for every sample or for every unit (unit at time of recording) and calculates how many bits at the LSB side were used for the high band signal component at the time of recording FIGS. 4A and 4B.

The word division circuit 11 divides the words in accordance with the number of bits found in accordance with the power. As illustrated in FIGS. 4A and 4B, the MSB side is used as data for the low frequency band signal component, while the LSB side is used as data for the high frequency band signal component.

The low frequency band signal component in the divided words is output from the word division circuit 11 to the frequency band combining filter 12 as is as 16-bit straight PCM.

The LSB portion used for the high frequency band signal component when dividing a word is stuffed with "0"s as illustrated in FIG. 4B (stuffed with data "0").

When the high frequency band signal component has been subjected to entropy coding at the entropy coding circuit 6, the entropy decoding circuit 13 reads out the code table recorded at the sub-code and decodes the coded data to straight PCM data. The straight PCM data decoded here is requantized data, so is smaller in amplitude than the original data.

Therefore, the amplification circuit 14 reads the number of requantization bits recorded in the sub-code area R to W, amplifies the amplitude to the size of 8 bits, then, as shown in FIGS. 4A and 4B, restores the 8-bit data to 16-bit data (no amplification performed), and outputs the result to the frequency band combining filter 12.

For the frequency band combining filter 12, use is made of a filter such as an "inverse QMF (IQMF or inverse quadrature mirror filter)" which performs filter processing inverse to the QMF in the frequency band division filter 1. This combines the divided low frequency band signal component and high frequency band signal component to reproduce the original audio signals.

This IQMF is an interpolation filter which restores the signals decimated to one-half the number of samples to the original number of samples and then performs the combination.

IQMFs are described in detail in the documents mentioned with respect to the QMFs.

It is also possible to use a filter other than an IQMF as the frequency band combining filter 12, but it is paired with the frequency band division filter i in the CD recording apparatus, so when a QMF is used for the frequency band division filter 1, it is necessary to use an inverse QMF as the frequency band combining filter 12. Similarly, if use if made of a CQF for the frequency band division filter 1, an inverse CQF is used for the frequency band combining filter 12.

As explained above, according to the first embodiment of the present invention, it is possible to record and reproduce on and from a CD audio signals of a frequency band (0 to 44.1 kHz) double that of the past by using a sampling frequency 88.2 kHz double the sampling frequency 44.1 kHz of existing CDs. As a result, it is possible to record and reproduce on and from a CD even broad base audio signals such as gamelan and yodeling, which were difficult to record and reproduce with existing CD recording and reproduction apparatuses.

In this embodiment, the CD format is not changed and use is made of straight PCH in the same way as in the past for audio signals of a sampling frequency 44.1 kHz, processable by existing CD recording and reproduction apparatuses, so the CD recording and reproduction apparatus of the first embodiment can reproduce audio signals recorded on existing CDs as well. Further, CDs on which are recorded coded audio signals by the CD recording apparatus in this embodiment can be reproduced without problem by existing CD reproduction apparatuses up to the sampling frequency of 44.1 kHz.

That is, the CD recording and reproduction apparatus and CDs of the first embodiment maintain compatibility with existing apparatuses etc.

Second Embodiment

Next, an explanation will be made of a CD recording and reproduction apparatus of a second embodiment of the digital audio signal processing apparatus of the present invention with reference to FIGS. 7A and 7B.

The CD recording and reproduction apparatus of the second embodiment differs from the CD recording and reproduction apparatus of the first embodiment in the method of handling of the code tables for the entropy coding of the high frequency band signal component.

Therefore, the CD recording apparatus illustrated in FIG. 7A is provided with a recording side code table ROM 21, and the reproduction apparatus illustrated in FIG. 7B is provided with the reproduction side code table ROM 22. The rest of the circuit configuration is substantially the same as the circuit configuration of the first embodiment.

In the CD recording apparatus of the first embodiment, the code table for entropy coding in the entropy coding circuit 6 was prepared for each unit and recorded in the sub-code. In the CD recording and reproduction apparatus of the second embodiment, provision is made of a recording side code table ROM 21 and a reproduction side code table ROM 22 in which are recorded the code tables in advance. The coding and decoding are performed by reading the content of the tables from these table ROMs 21 and 22.

Figure 8:
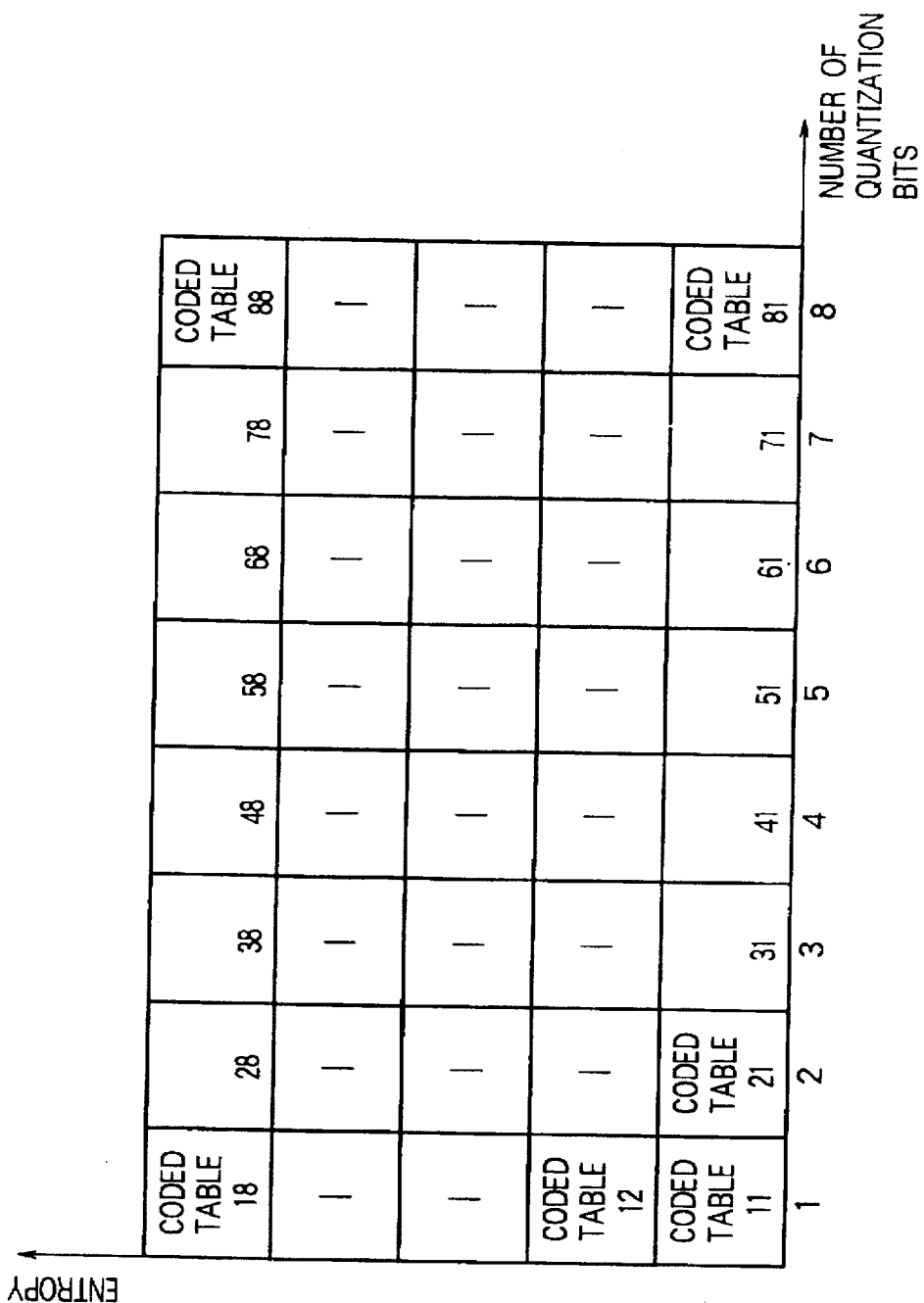
FIG. 8 is a view of the construction of a code table which is stored in the code table ROM shown in FIGS. 7A and 7B and which is used for entropy coding in an entropy coding circuit.

FIG. 8 is a view showing an example of code tables stored in the recording side code table ROM 21 and reproduction side code table ROM 22. In FIG. 8, for example, a coded table "38" indicates that the number of the quantization bits is three and the number of entropy is 8. The recording side code table ROM 21 and the reproduction side code table ROM 22 store several tables for each requantization bit. The optimal table is used for the input audio signals in accordance with the signal distribution. The recording side code table ROM 21 records in the sub-code area R to W which number table was used so as to enable reproduction of the audio signals at the CD reproduction apparatus. The reproduction side code table ROM 22 reads the information recorded at the sub-code area R to W to determine the code table used by the CD recording apparatus and uses the data of that table to decode the coded data.

The CD recording and reproduction apparatus of the second embodiment does not require recording of a large amount of code tables of numbers of requantization bits etc. in the sub-code area as with the first embodiment. As a result, there are the advantage that when the apparatus is made smaller in size, there is no longer a shortage in capacity for the code tables and the advantage that the code only shows which table was used, so there is resistance to error in reading the sub-codes.

Further, in the second embodiment, it is clear from the information on which code table was used how many bits the high band signal component was requantized by, so there is the advantage that it is not necessary to record the number of requantization bits as in the first embodiment.

Third Embodiment

An explanation will now be made of a CD recording and reproduction apparatus as a third embodiment of the digital audio signal processing apparatus of the present invention referring to FIGS. 9A and 9B.

In the third embodiment, when dividing the words of the low frequency band signal component to record high frequency band information, like in the first embodiment and the second embodiment, the recording is performed not in the time domain, but the frequency domain.

Therefore, the CD recording apparatus illustrated in FIG. 9A is provided with a recording side fast Fourier transform (FFT) circuit 31, a recording side allowable noise calculation circuit 32, and a recording side inverse fast Fourier transform circuit (IFFT circuit) 33. Similarly, the CD reproduction apparatus illustrated in FIG. 9B is provided with a reproduction side FFT circuit 34, reproduction side allowable noise calculation circuit 35, and reproduction side inverse fast Fourier transform circuit (IFFT circuit) 36. The other constituent elements illustrated in FIG. 9A and FIG. 9B are substantially the same as those illustrated in FIG. 1A and FIG. 1B.

An explanation will first be made of the CD recording apparatus illustrated in FIG. 9A.

The frequency band division filter 1 divides the input audio signals into two, that is, a low frequency band signal component and a high frequency band signal component.

The recording side FFT circuit 31 subjects the divided low frequency band signal component to Hamming window or other window processing, then performs fast Fourier transform processing to convert the time domain signals to frequency domain spectra.

The recording side FFT circuit 31, when calculating the FFT processing, requires a number of data equal to a factor (power) of 2 as the input audio signals, but as mentioned above use is made of symbols (data) of a plurality of blocks as the input audio signals, so a number of data equal to a factor of 2 is not necessarily obtained. Therefore, the calculation is performed at the recording side FFT circuit 31 stuffing "0" at the missing portions.

The recording side allowable noise calculation circuit 32 divides the spectrum found by the recording side FFT circuit 31 into critical bands, finds the allowable noise for each critical band, with consideration given to the so-called masking effect etc., and thereby calculates the allowable noise.

Here, a "critical band" is a frequency band obtained by division with consideration given to human auditory characteristics. It is a frequency band having noise when a pure sound is masked by narrow band noise of the same intensity near the frequency of the pure sound.

This critical frequency band becomes broader in width the higher the frequency band of the signal component. The entire frequency band of the low frequency band signal component is divided into 25 critical frequency bands in this embodiment.

Figure 10:
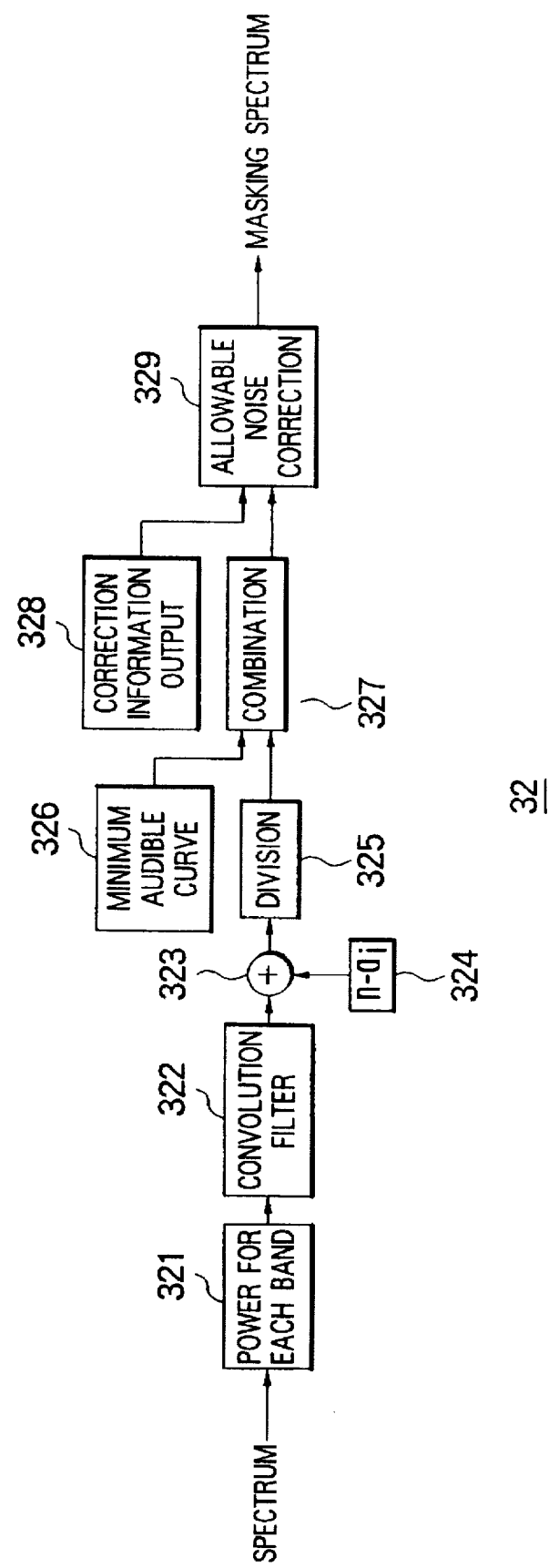
FIG. 10 is a view of the circuit configuration of an allowable noise calculation circuit of FIG. 9A and 9B.

FIG. 10 is a view of the detailed circuit configuration of the recording side allowable noise calculation circuit 32.

The recording side allowable noise calculation circuit 32 is supplied with the spectral data on the frequency axis from the recording side FFT circuit 31. As the spectral data used here, in this embodiment, use is made of the amplitude value among the amplitude value and phase value calculated based on the real number component and imaginary number component of the FFT coefficient data obtained by FFT computation at the recording side FFT circuit 31. The reason is that in general the human auditory sense is sensitive to amplitude (level and intensity) on a frequency axis, but considerably dull when it comes to the phase, so the phase values are not used so as to streamline the processing.

The input data on the frequency axis is supplied to the power calculation circuit 321 for each critical band and the power for each critical frequency band is found. In place of the power of each critical frequency band, use may also be made of the peak value, mean value, etc. of the amplitude.

The spectrum of the sum of the frequency bands used as output data from the power calculation circuit 321 for every critical frequency band is generally called the "bark spectrum".

Figure 11:
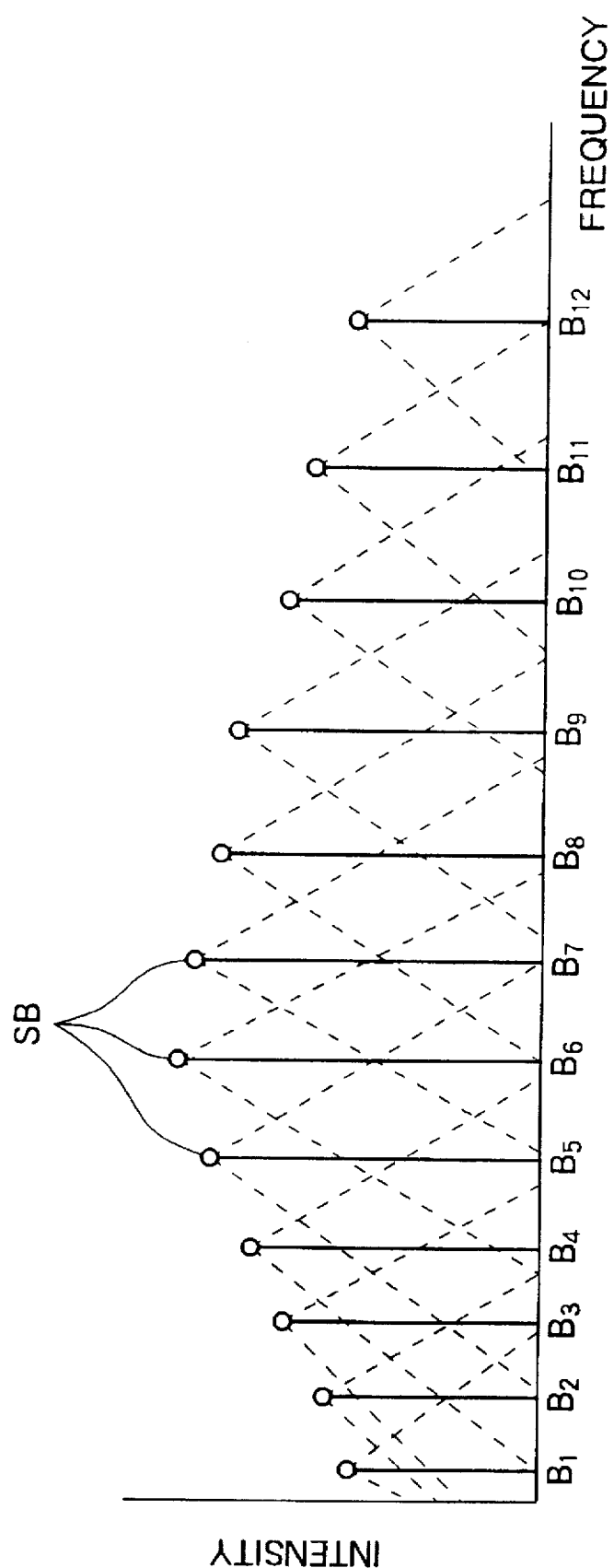
FIG. 11 is a graph of a bark spectrums

FIG. 11 is a graph showing the bark spectrum SB for each critical frequency band. In FIG. 11, for simplification, the number of frequency bands of the critical frequency bands is expressed not by the 25 bands as explained above, but by 12 bands (B1 to B12).

In consideration of the effects of the bark spectrum SB in so-called "masking", convolution processing is applied wherein a predetermined weighing function is applied to the bark spectrum SB and then addition performed. Therefore, the output of the power calculation circuit 321 for each critical frequency band, that is, the values of the bark spectrum SB, are supplied to the convolution filter 322.

Note that "masking" refers to the phenomenon of one signal being masked and made inaudible by another signal due to human auditory characteristics. This masking effect includes the time-domain masking effect caused by audio signals on the time axis and simultaneous time masking effect caused by signals on the frequency axis. Due to these masking effects, even if there is noise at a masked portion, that noise will not be audible. Therefore, in actual audio signals, the noise in the masked range is considered allowable noise.

The convolution filter 322 is comprised for example of a plurality of delay elements for giving successive delays to the input data, a plurality of multipliers (for example, 25 multipliers corresponding to the critical frequency bands) for multiplying filter coefficients (weighting functions) with the outputs from these delay elements, and sum adders for obtaining the sum of the multiplier outputs. The convolution processing by the convolution filter 322 gives the sum of the portions shown by the broken line in FIG. 11.

A specific example of the multiplication coefficients (filter coefficients) of the multipliers of the convolution filter 322 will be shown next. If the coefficient of the multiplier M corresponding to any one band is made 1, by multiplying with the outputs of the delay elements (1) the coefficient 0.15 at the multiplier M−1,
(2) the coefficient 0.0019 at the multiplier M−2,
(3) the coefficient 0.0000086 at the multiplier M−3,
(4) the coefficient 0.4 at the multiplier M+1,
(5) the coefficient 0.06 at the multiplier M+2, and
(6) the coefficient 0.007 at the multiplier M+3, convolution processing of the bark spectrum SB is performed. In this embodiment, M may be any integer of the number of critical frequency bands 1 to 25.

The output of the convolution filter 322 is supplied to the subtractor 323. The subtractor 323 finds the spectrum level ff corresponding to the allowable noise level, discussed later, in the convoluted domain.

The spectrum level ff corresponding to the noise level which can be allowed (allowable noise level), as discussed later, is the level giving the allowable noise level of each band of the critical bands by inverse convolution processing.

The subtractor 323 is supplied with the admissible function for finding the spectrum level ff (function expressing masking level). The subtractor 323 adds or subtracts the admissible function with respect to the result from the convolution filter 322 to control the spectrum level ff.

The admissible function is supplied from the (n−a$_i$) function generating circuit 324.

The spectrum level ff corresponding to the allowable noise level is given by the following equation 1 if the no. given in order from the low frequency band of the critical frequency bands is made $i$.

$$\alpha = S - (n - a_i) \ldots (1)$$

In equation 1, $n$ and $a_i$ are constants and $a_i > 0$. Particularly, $a_i$ is an Eigen value at the respective frequency. The symbol S indicates the strength of the bark spectrum SB subjected to convolution processing at the convolution filter 322. (n−a$_i$) is the admissible function.

In this embodiment, as a specific example, $n$ was made 38 and $a$ was made 1. Experiments showed that there was no degradation of the sound quality at this time and excellent coding was performed.

The spectrum level ff was found at the subtractor 323 and the level data transmitted to the divider 325 in this way.

The divider 325 performs inverse convolution on the level ff at the convoluted domain. By performing this inverse convolution, a masking spectrum is obtained from the level ff. This masking spectrum becomes the allowable noise spectrum, because the division on the frequency axis corresponds to the inverse convolution calculation on the time axis.

Note that the inverse convolution is more precisely inverse processing of the convolution filter 322, so complicated computations are required, but in this embodiment they are simplified and computations corresponding to inverse convolution are performed at the divider 25.

The combination circuit 327, when combining the results of the divider 325, can combine the data showing the so-called "minimum audible curve RC", that is, the human auditory characteristics shown in FIG. 12 and supplied from the minimum audible curve generation circuit 326, and the "masking spectrum MS". FIG. 12 shows the signal spectrum (the output spectrum of the FFT circuit 31) SS as well.

In the minimum audible curve RC shown in FIG. 12, if the absolute noise level is lower than this minimum audible curve, the noise cannot be heard by a human.

The minimum audible curve RC differs due to differences in the reproduction volume at the time of reproduction even in the case of the same coding. In an actual digital audio signal processing apparatus, however, there is not that great a difference in the method of insertion of music in for example a 16-bit dynamic range. Accordingly, if quantization noise of the most easily audible frequency band of near 4 kHz, for example, cannot be heard, then it may be considered that the quantization noise of less than the level of the minimum audible curve at other frequency bands cannot be heard.

In this way, if it is assumed that the method of use is one in which the noise near 4 kHz of the word length of the CD recording apparatus cannot be heard and the allowable noise level is obtained by combining the minimum audible curve RC and the masking spectrum MS, the allowable noise level in this case can be made one up to the portion shown by the hatching in FIG. 12.

In the third embodiment, the 4 kHz level of the minimum audible curve RC is matched with the minimum level corresponding to 20 bits for example.

The allowable noise correction circuit 329 corrects the allowable noise level with respect to the output from the combination circuit 327 based on for example the information of the "equal loudness curve" output from the correction information output circuit 328.

The "equal loudness curve" is a curve relating to human auditory characteristics. The curve is obtained by finding the sound pressures at different frequencies which sound the same in magnitude as a pure sound of 1 kHz and is also called a curve of equal sensitivity of loudness. This equal loudness curve is generally the same curve as the minimum audible curve RC shown in FIG. 12.

The equal loudness curve will be explained next. Near the frequency 4 kHz, for example, even if sound falls 8 to 10 dB from 1 kHz, it will sound the same in loudness as the 1 kHz. Conversely, near 10 kHz, a sound will not sound the same in loudness unless made about 15 dB higher than the sound at 1 kHz. As a result, the noise exceeding the level of the minimum audible curve (allowable noise level) may be made to have frequency characteristics given by a curve corresponding to the equal loudness curve.

Accordingly, correction of the allowable noise level by consideration of the equal loudness curve, it will be understood, meets with human auditory characteristics. The masked frequency domain found in this way is used for recording the high frequency band signal component.

The necessary bit calculation circuit 3 of the CD recording apparatus shown in FIG. 9A calculates the number of bits of a magnitude corresponding to the allowable noise spectrum found at the recording side allowable noise calculation circuit 32, that is, the spectrum allottable for the high frequency band signal component. Namely, under the relationship that −6 dB corresponds to 1 bit, the calculation of the number of bits corresponding to the allottable spectrum is carried out.

The spectrum found at the recording side FFT circuit 31 in this way, as shown in FIG. 4A, has the information of the high frequency band signal component recorded at a frequency domain masked by the frequency domain. The remaining total bit calculation circuit 4 shown in FIG. 9A, like with the remaining total bit calculation circuit shown in FIG. 1A, finds the number of bits of the masking spectrum in one unit and calculates the number of bits B allottable for recording the high frequency band signal component in one unit. The high band frequency signal component is subjected by high efficiency coding by processing similar to the first embodiment.

The bit redistribution circuit 9, like with the first embodiment, records the information of the high frequency band signal component in the masking spectrum, that is, at the LSB side of the spectrum found at the recording side FFT circuit 31.

The recording side inverse FFT circuit 33 performs inverse Fourier transform processing for restoring the frequency domain spectrum to time domain signals.

The time domain waveform signals (wave data) output from the recording side inverse FFT circuit 33 are a number of data corresponding to a factor of 2. The original input audio signals (wave data), however, are not necessarily a number of data of a factor of 2, so when recording them as wave data on a CD, the extra parts are discarded.

The operation of the CD reproduction apparatus shown in FIG. 9B will be explained next.

The wave data is subjected to preliminary processing such as window processing or "0" stuffing at the reproduction side FFT circuit 34 which is similar to the recording side FFT circuit 31, then is subjected to fast Fourier transform processing to convert the time region wave data to a frequency domain spectrum.

The reproduction side allowable noise calculation circuit 35, like with the recording side allowable noise calculation circuit 32, receives as input the spectrum found at the reproduction side FFT circuit 34 and finds the masking spectrum. Further, the reproduction side allowable noise calculation circuit 35 calculates the number of bits of the masking spectrum and calculates by how many bits the spectrum found by the reproduction side FFT circuit 34 is divided.

The word division circuit 11 divides the spectrum found by the reproduction side FFT circuit 34 based on the number of bits found by the reproduction side allowable noise calculation circuit 35. The region calculated as the masking spectrum divided here is used as the high frequency band data, while if not masked, the calculated spectrum is restored to time domain waveform signals (wave data) as the low frequency band data.

The low frequency band side is subjected to inverse fast Fourier transform processing by the recording side inverse FFT Circuit 36 to be restored to the time domain waveform signals (wave data) which are then input to the frequency band combining filter 12. At this time, "0" is stuffed in the portion where the high frequency band data had been as the masking spectrum.

The time domain waveform signals found by the recording side inverse FFT circuit 36 are a number of data corresponding to a factor of 2, but the original input audio signals are not necessary a number of data corresponding to a factor of 2, so the excess part is discarded.

The entropy decoding circuit 13, like in the first embodiment, reads the data in the code table from the sub-code areas R to W and decodes the data in the table to straight PCM data.

The decoded straight PCM data is requantized data, in the same way as explained in the first embodiment, so has a smaller amplitude than the original data. Therefore, the amplification circuit 14 reads the number of requantization bits recorded in the sub-code and, in the same way as in the first embodiment, amplifies the amplitude to convert to 16-bit data and outputs the result to the frequency band combining filter 12.

The frequency band combining filter 12 uses a filter forming a pair with the frequency band division filter 1 in the same way as in the first embodiment. It performs similar processing to the first embodiment to output reproduced audio signals.

Fourth Embodiment

A CD recording and reproduction apparatus as a fourth embodiment of the digital audio signal processing apparatus of the present invention will be explained with reference to FIGS. 13A and 13B.

The fourth embodiment is a combination of the processing of the high frequency band signal component using the recording side code table ROM 21 in the second embodiment shown in FIGS. 7A and 7B and the processing of the low frequency band signal component using the recording side FFT circuit 31 and recording side allowable noise calculation circuit 32 in the third embodiment shown The CD recording apparatus illustrated in FIG. 13A is provided with a frequency band division filter 1 for dividing the input audio signals into a low frequency band signal component and a high frequency band signal component. The low frequency band signal component obtained by division at the frequency band division filter 1 is coded in the recording side FFT circuit 31, recording side allowable noise calculation circuit 32, necessary bit calculation circuit 3, remaining total bit calculation circuit 4, bit redistribution circuit 9, and recording side inverse FFT circuit 33. The high frequency band signal component obtained by the division at the frequency band division filter 1 is coded in the requantization circuit 50 the recording side code table ROM 21, the entropy coding circuit 6, total bit calculation circuit 7, comparison circuit 8, bit redistribution circuit 9, and recording side inverse FFT circuit 33.

The CD reproduction apparatus illustrated in FIG. 13B reproduces the wave data read from the CD (low frequency band signal component) by the reproduction side FFT circuit 34, reproduction side allowable noise calculation circuit 35, word division circuit 11, and recording side inverse FFT circuit 36. The data showing the high frequency band signal component read from the CD is decoded at the reproduction side code table ROM 22, entropy decoding circuit 13, and amplification circuit 14. These decoded (reproduced) low frequency band signal component and high frequency band signal component are combined at the frequency band combining filter 12.

Fifth Embodiment

An explanation will now be made of a CD recording and reproduction apparatus as a fifth embodiment of the digital audio signal processing apparatus of the present invention.

Figure 14:
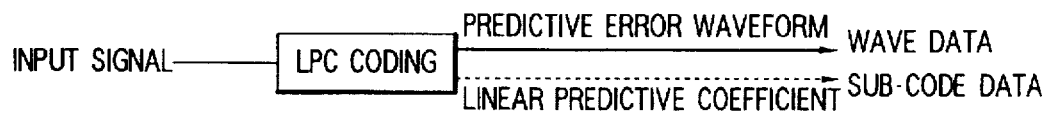
FIG. 14 is a view illustrating the schematic configuration for applying LPC as another example of high efficiency coding in a CD digital audio signal processing apparatus according to a fifth embodiment of the digital audio signal processing apparatus of the present invention.

In the first to fourth embodiments, illustration was made of entropy coding for data compression of the high frequency band signal component, but in the fifth embodiment, as shown in FIG. 14, "linear predictive coding (LPC)" is used for the high frequency band signal component.

LPC is based on the idea that there is a relationship between audio waveform data (wave data) and the past several sample values and assumes that the sample value at a certain point of time may be approximated as shown in the following equation 2 by linear combination of the past p number of data in the event of a discrete time series $S_1, S_2 \ldots$ of speech:

$$[\hat{S}]_n = \sum_{k=1}^{P} a_k S_{n-k} \quad (2)$$

where, the combining coefficient $a_k$ is called the linear predictive coefficient, p is called the predictive order, and the error $e_n$ between the true value and the approximated value is called the predictive error.

If good prediction is possible by LPC, the error power becomes smaller and coding is possible with a smaller bit rate.

Figure 15:
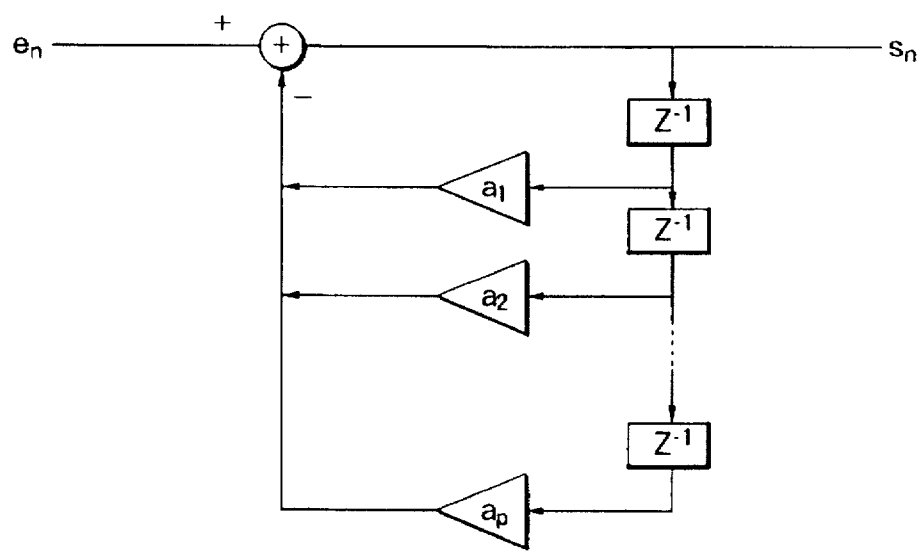
FIG. 15 is a view of the circuit configuration of a filter.

At the decoding side (reproduction side), as shown in FIG. 15, a filter is produced by a linear predictive coefficient, the error is input, and the original waveform (input audio signals) is restored by the following equation 3.

$$S_n = e_n + \sum_{k=1}^{P} a_k S_{n-k} \quad (3)$$

Note that LPC is discussed in detail in Itakura and Saito, "Saiyu Supekutoru Suiteiho ni Yoru Onsei Bunkai Gosei Tenso Hoshiki" (Speech Analysis, Synthesis, and Transmission System Using Most Likelihood Spectrum Estimation Method), Reports of Acoustical Soc. of Japan, pp. 231, 1967 and B. S. Atal, M. R. Schroeder, "Predictive Coding of Speech Signals", Reports of 6th Int. Conf. acoust., C-5-4, 1968, etc. Further, details of the LPC calculation algorithms are described in numerous references, so are omitted here.

Figure 16:
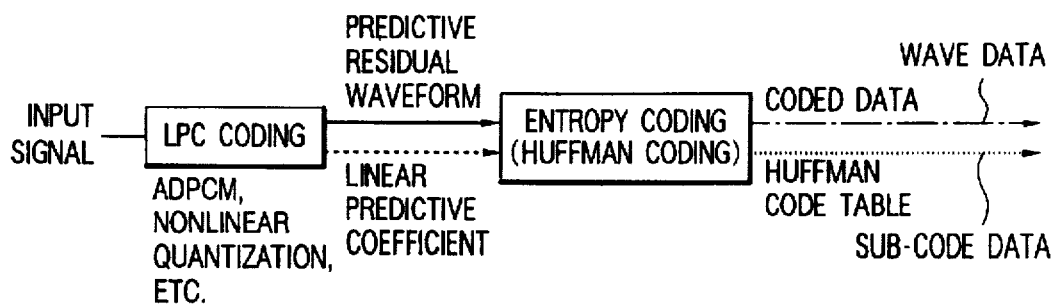
FIG. 16 is a view illustrating the schematic configuration for applying LPC as another example of high efficiency coding in a CD digital audio signal processing apparatus according to a sixth embodiment of the digital audio signal processing apparatus of the present invention.

As a method for recording on a medium the linear predictive codes and predictive error waves obtained by this LPC, in addition to the method of recording the linear predictive coefficients in the sub-codes and the predictive error wave at the low band LSB side as illustrated in FIG. 14, various methods may be considered, such as the method of further performing entropy coding, such as represented by Huffman coding, on the linear predictive coefficients and predictive error waves and recording the code portion at the low band LSB side and the tables as sub-codes as illustrated in FIG. 16.

Further, it is possible to make the linear predictive order fixed or to change the order in accordance with the signals and record information on the order in the sub-codes. Table 1 shows an example of calculation of the unit sizes and the recordable linear predictive orders.

TABLE 1

| 1 unit length (blocks) | No. of samples in 1 unit (samples/channel) | Usable sub-codes (bits/channel) | Linear predictive order recordable in sub-code |
|---|---|---|---|
| 1 | 576 | 294 | 9 |
| 2 | 1152 | 588 | 18 |
| 3 | 1728 | 882 | 27 |
| 4 | 2304 | 1176 | 36 |

As the high efficiency coding in the recording of the high frequency band signal component, use may be made of not only the above-mentioned entropy coding and LPC, but also adaptive PCM (ADPCM) and other nonlinear quantization or vector quantization. Further, it is possible to perform high efficiency compression by finding auditory information on the frequency axis and finding masking etc.

Further, it is possible to subject the code obtained by coding by the above method to further entropy coding as illustrated in FIG. 16.

In each of the above embodiments, the input audio signals are processed for each unit of a plurality of blocks, so a time lag occurs with the reading speed of conventional media at the time of reproduction. One method of solving this is to read faster than the reading speed from a conventional recording medium. A specific example of this will be given. In the case of a CD, the CD is driven faster than the normal reading speed, for example, twice as fast, to read the data. The read data is stored in a buffer memory and successively reproduced while processing it. By doing this, it is possible not only to eliminate the time lag, but also to improve the resistance to jumping caused by vibration of the CD.

Further, by using an error correction code weighted to the MSB side, where the conventional reproduction band, that is, low band signal component, is recorded, it is possible to reduce the reading errors of the conventional reproduction frequency band and prevent degradation of the sound quality.

Note that the present invention is not limited to Just the above embodiments. As illustrated generally in FIG. 17, the medium may be not only a CD, but also an LD or magnetic tape.

Figure 17:
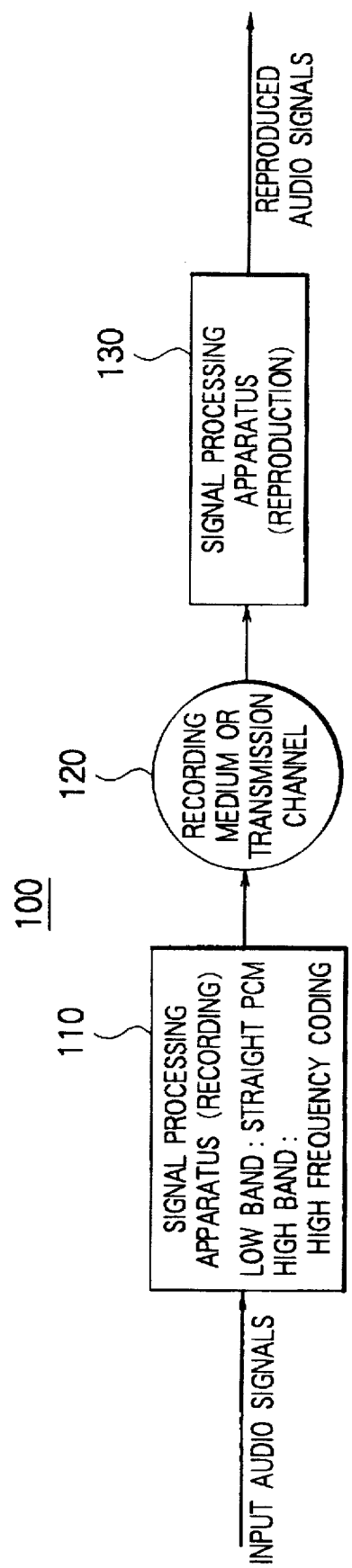
FIG. 17 is a view of the configuration of a digital audio signal processing apparatus of the present invention.

Further, as the medium shown in FIG. 17, use may also be made of data transmission using ISDN and other communication means, digital video, IC cards, and other recording media.

FIG. 17 is a view of the configuration of a basic digital audio signal processing apparatus 100 of the present invention.

The digital audio signal processing apparatus 100 is comprised of a first digital audio signal processing apparatus (hereinafter referred to as a "first signal processing apparatus") 110, a medium 120, and a second digital audio signal processing apparatus (hereinafter referred to as a "second signal processing apparatus") 130.

When a CD, LD, magnetic tape, or other recording medium is used as the medium 120, the first signal processing apparatus is a digital audio signal recording apparatus (hereinafter referred to as a "recording apparatus"). This recording apparatus performs compression or other signal processing on the input audio signals and records the result on the recording medium. The second signal processing apparatus 130, in this case, is a digital audio signal reproduction apparatus (hereinafter referred to as a "reproduction apparatus") and reproduces audio signals stored on the recording medium in the above fashion.

When a transmission channel is used as the medium 120, the first signal processing apparatus is a digital audio signal coding and transmission apparatus. This coding and transmission apparatus performs signal processing on the input audio signals and outputs the result to the transmission channel. The second signal processing apparatus 130 is a digital audio signal decoding apparatus which decodes the signals from the transmission channel to the original digital audio signals.

The first signal processing apparatus 110 divides the broad frequency band digital audio signals into a plurality of frequency bands and performs coding in accordance with those frequency bands. One of the divided frequency bands is a frequency band which can be reproduced by an existing reproduction apparatus. The signals of this frequency are modulated in a manner reproducible at an existing reproduction apparatus. The first signal processing apparatus 110 performs high efficiency coding on the signal components of the other frequencies.

When a CD is used as the medium 120, the apparatus becomes the audio signal recording and reproduction apparatus mentioned above. When using an existing CD reproduction apparatus as the CD reproduction apparatus 130, the audio signals of a frequency band less than the maximum reproduction frequency 22.05 kHz can be reproduced in the same way. In existing CD reproduction apparatuses, however, even if gamelan, yodeling, or other broad frequency band (high frequency band) component audio signals were recorded on a CD 120, that component could not be accurately reproduced. The frequency low band signal component, however, can be reproduced in the same way as in the past, so the usefulness and compatibility are maintained. When use is made, as the CD reproduction apparatus 130, of a reproduction apparatus which can not only reproduce a low frequency band signal component, of course, but also an audio signal of a frequency band greater than the maximum reproduction frequency of 22.05 kHz by high efficiency decoding, it is possible not only to reproduce the low frequency band audio signals, but also to accurately reproduce high frequency band audio signals such as including in gamelan and yodeling.

The audio signals in the present invention may be audible or inaudible, that is, may be any frequency band. Further, the audio signals in the present invention mean all signals including sound such as various speech and various types of sound.

Further, in the above embodiments, the explanation was made of processing of digital audio signals as preferred embodiments, but the present invention may also be applied to digital video signals.

Sixth Embodiment

When recording on and/or reproducing from a recording media such as a CD a digital audio signal which is obtained at a sampling frequency higher than 44.1 KHz, and/or, the quantized bit number of which is greater than 16 bits, as an input signal, while maintaining the compatibility to the conventional CD format, in other words, when a digital audio signal which is improved a sound quality to the conventional audio signal recorded in the conventional CD without change the CD format, the following can be adopted.

First, the input audio signal which is improved the sound quality is divided into two signals; a first signal being an audio signal corresponding to the conventional audio signal which can be recorded on the conventional CD by the conventional CD format, and a second signal being another audio signal other than the above conventional audio signal and which is a signal for improving a sound quality. The first signal is stored in a certain area of the media in accordance with the conventional CD format, and the second signal is stored in vacant regions of the media which are not yet used. Note, among the CDs already on the market, the CDS wherein the audio signal is recorded full approximately 74 minutes which is the maximum recordable time of the CD are few, and thus, there are vacant regions in such a CD, and the second signal for improving the sound quality can be stored in those vacant regions.

Figure 18:
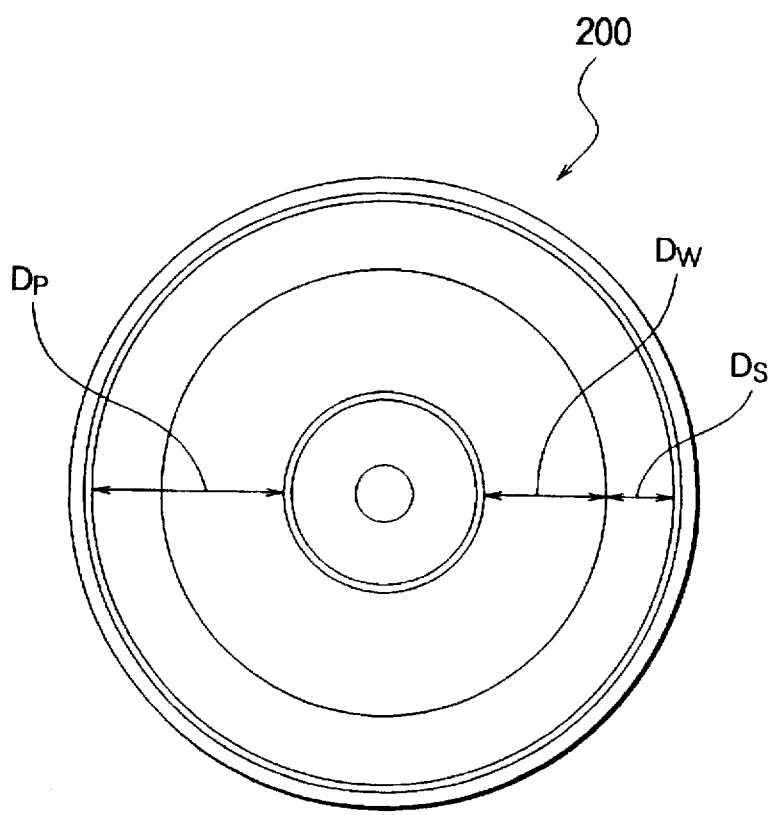
FIG. 18 is a schematic view of a CD used for recording a conventional digital audio signal by a conventional CD format and for recording signals other than the conventional digital audio signal.

Specifically, as shown in FIG. 18, the above first signal which is the conventional sound signal is recorded in a conventional recording region Dw of a CD 200 in accordance with the conventional CD format, and the above second signal which is used for improving the sound quality is recorded in a vacant region Ds of the CD 200. The CD 200 has a whole region Dp which is Dw+Ds. According to the CD format, a signal is recorded from inside of the CD 200 to outer side, and thus, the vacant region Ds is positioned at the outer side of the conventional recording region Dw.

Figure 19:
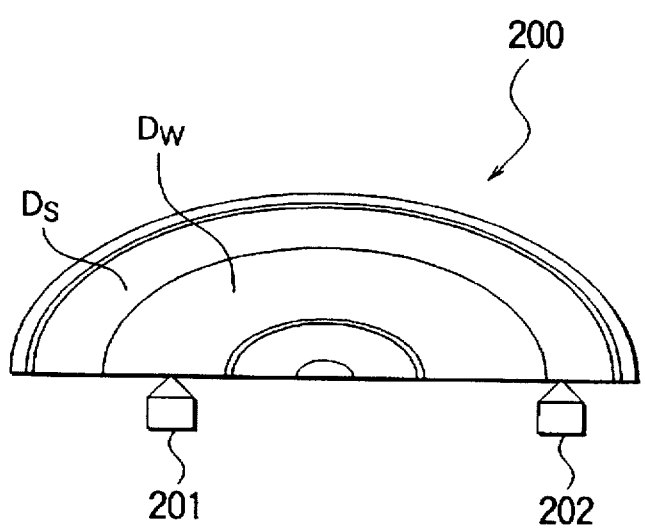
FIG. 19 is a schematic view of a part of a CD apparatus when reading data from the CD.

Note, the first signal in the region Dw and the second signal in the region Ds must be read simultaneously, and thus, as shown in FIG. 19, there must be provided two optical pick-ups 201 and 202. A first optical pick-up 201 is used for reading the first signal recorded in the region Dw, and a second optical pick-up 202 is used for reading the second signal recorded in the region DS. The optical pick-ups 101 and 102 must be worked independently, and thus an arrangement of both the pick-ups 101 and 102 is designed to avoid both the pick-ups 101 and 102 placing in the same radial direction.

Note, the recording of the second signal for improving the sound quality to the region DS is not subjected to the conventional CD format, so the second signal can be recorded at a higher recording density than that of the region Dw. Of course, in this case, the pick-up 202 for the region Ds must be provided with a laser having a shorter wavelength than that of a laser in the pick-up 201 for the region Dw.

Further, media control signals, character information, still picture information, moving picture information and musical instrument information (MIDI) can be recorded in the vacant region Ds of the media (CD) and can be read to use the same at reproduction.

According to the signal processing and recording and reproduction apparatus of the present invention, it becomes possible to reproduce signals of double the frequency band of the reproduction frequency band of a CD with the same recording media and storage capacities as in the past. Further, in the present invention, the compatibility with existing CD reproduction apparatuses is maintained, so the sub-word portions of straight PCM can be reproduced at a sound quality close to that of full words in an existing reproduction apparatus.

Further, when using the apparatus of the present invention, in addition to the sub-word portion of straight PCM, the sub-word portion subjected to high efficiency coding is processed and reproduced and so a sound of a broader band can be reproduced.

Further, by dividing the band into two and recording the low frequency band portion by straight PCM, even a conventional reproduction apparatus can reproduce the conventional reproduction frequency band, though cannot reproduce the high frequency band, so it is not necessary to provide two types of recording medium for conventional reproduction apparatuses and for reproduction apparatuses according to the present invention.

Further, it is possible to reproduce the high frequency band portion even in a conventional reproduction apparatus by reading the data from the medium, extracting the bit stream, and adding just the signal processing portion of the reproduction apparatus of the present invention.

What is claim is:

1. A digital audio signal recording apparatus, comprising:
   a frequency band dividing means for dividing an input digital audio signal into a low frequency band having a plurality of first signal components which include sub-frequency band information and a high frequency band having a plurality of second signal components which include sub-frequency band information;
   a first coding means for coding said first signal components of said low frequency band using a coding process compatible with conventional with conventional CD reproduction methods to produce a first result of coding;
   a second coding means for coding the second signal components using a high efficiency coding to produce a second result of coding, and
   an integrating and recording means for integrating said first result of coding and said second result of coding and recording the result on a recording medium.

2. A digital audio signal recording apparatus as set forth in claim 1, wherein said frequency band dividing means performs preliminary processing to reduce auditory effects of quantization noise before said frequency band division.

3. A digital audio signal recording apparatus as set forth in claim 1, wherein said frequency band dividing means has a frequency band dividing filter selected from the group of a quadrature mirror filter (QMF), a conjugate quadrature filter (COF), and equal bandwidth filter.

4. A digital audio signal recording apparatus as set forth in claim 1, wherein said input digital audio signal is comprised of words and said first coding means comprises:
   a first encoder for coding said first signal components to produce said first result of coding,
   a word dividing means for dividing the words based on values indicating the extent of coding for said first signal components,
   a means for calculating a first number of bits necessary for coding said first signal components based on said calculated value, and
   a remaining total bit calculating means for calculating the remaining total number of bits for a predetermined bit length.

5. A digital audio signal recording apparatus as set forth in claim 1, wherein said first coding means performs straight pulse code modulation (PCM).

6. A digital audio signal recording apparatus as set forth in claim 4, wherein said word dividing means divides words in a time domain.

7. A digital audio signal recording apparatus as set forth in claim 6, wherein said word dividing means comprises
   a circuit for calculating an allowable noise level of said first signal components and
   a circuit for dividing words for each sample by a certain rate in accordance with said calculated noise level.

8. A digital audio signal recording apparatus as set forth in claim 6, wherein said word dividing means comprises:
   a circuit for calculating an allowable noise level of said first signal components and
   a circuit for dividing words in an average fashion in accordance with said calculated noise level for the plurality of words of a unit of audio signals which have been input.

9. A digital audio signal recording apparatus as set forth in claim 7, wherein said circuit for calculating an allowable noise level of said word dividing means calculates one of the power, maximum amplitude, or average value of said first band signal component as a parameter expressing said allowable noise level.

10. A digital audio signal recording apparatus as set forth in claim 6, wherein said second coding means comprises:
   a requantizing means for quantizing said second signal components within a predetermined number of bits to produce requantized data,
   a second encoder for performing high efficiency coding on said requantized data to produce the second result of coding,
   a means for calculating a second number of bits expressing the number of bits to be subjected to the high efficiency coding, and
   a comparing means for comparing said second number of bits and said first number of bits and, when the second number of bits is larger than the first number of bits, further reducing the number of quantization bits in said requantizing means and then causing said requantizing means to perform requantization, wherein said requantizing means, upon receipt of an instruction from said comparing means, reduces the number of bits further, performs requantization, and sends the result to said second encoder, and wherein said integrating and recording means redistributes the bits of said first result of coding and said second result of coding using said first number of bits and second number of bits.

11. A digital audio signal recording apparatus as set forth in claim 10, wherein said second encoder in said second coding means performs high efficiency coding on at least one sub-frequency band information of said second signal components by said distributed sub-words.

12. A digital audio signal recording apparatus as set forth in claim 11, wherein said coding means in said second coding means performs entropy coding on said at least one sub-frequency band information to be coded and said integrating and recording means performs redistribution by a variable bit rate.

13. A digital audio signal recording apparatus as set forth in claim 12, wherein said second coding means in further comprises:

a plurality of code tables for storing contents of codes prescribed based on the result of quantization in said requantizing means; and means using said plurality of code tables for performing said high efficiency coding, determining the code table producing the best result of coding, and outputting an indication of the code table determined as producing the best result of coding.

14. A digital audio signal recording apparatus as set forth in claim 11, wherein:

said second encoder in said second coding means performs non-linear quantization on said sub-frequency band information to be coded and said integrating and recording means performs redistribution using a variable bit rate.

15. A digital audio signal recording apparatus as set forth in claim 11, wherein:

said second encoder in said second coding means performs linear predictive coding on said sub-frequency band information to be coded and said integrating and recording means performs redistribution using a fixed bit rate.

16. A digital audio signal recording apparatus as set forth in claim 11, wherein:

said second encoder in said second coding means performs vector quantization on said sub-frequency band information to be coded and said integrating and recording means performs redistribution using a fixed bit rate.

17. A digital audio signal recording apparatus as set forth in claim 14, wherein said second encoder in said second coding means further performs entropy coding.

18. A digital audio signal recording apparatus as set forth in claim 5, wherein said integrating and recording means additionally records on said recording medium information expressing by which of straight PCM or high efficiency coding sub-frequency band information was coded.

19. A digital audio signal recording apparatus as set forth in claim 18, wherein said recording medium comprises one of a compact disk, a laser disk, and a magnetic tape.

20. A digital audio signal recording apparatus as set forth in claim 4, wherein said word dividing means divides words in a frequency domain.

21. A digital audio signal recording apparatus as set forth in claim 20, wherein said word dividing means comprises:

a means for converting said first signal components into a frequency domain, a circuit for calculating an allowable noise level of said first signal components converted to said frequency domain, a circuit for dividing words for each sample by a rate in accordance with said calculated noise level, and a frequency and time domain converting means, which is provided after said integrating and recording means, for restoring said frequency domain signal component to a time-domain signal component.

22. A digital audio signal recording apparatus as set forth in claim 20, wherein said word dividing means comprises:

a means for converting said first signal components into a frequency domain, a circuit for calculating an allowable noise level of said first signal components converted to said frequency domain, a circuit for dividing words in an average fashion in accordance with said calculated noise level for the plurality of words of a unit of audio signals which have been input, and a frequency and time domain converting means which is provided after said integrating and recording means for restoring said frequency domain signal component to a time domain signal component.

23. A digital audio signal recording apparatus as set forth in claim 21, wherein said circuit for calculating an allowable noise level of said word dividing means calculates one of the power, maximum amplitude, or average value of said first frequency band signal components as a parameter expressing said allowable noise level.

24. A digital audio signal recording apparatus as set forth in claim 22, wherein:

said means for converting said time domain signal component to a frequency domain signal component has a fast Fourier transform circuit and said means for converting a frequency domain signal component to a time domain signal component has an inverse fast Fourier transform circuit.

25. A digital audio signal recording apparatus as set forth in claim 20, wherein said second coding means comprises:

a requantizing means for quantizing said second signal components within a predetermined number of bits to produce requantized data, a second encoder for performing high efficiency coding on said requantized data to produce the second result of coding, a means for calculating a second number of bits expressing the number of bits subjected to the high efficiency coding, and a comparing means for comparing said second number of bits and said first number of bits and, when said second number of bits is larger than said first number of bits, further reducing the number of quantization bits in said requantizing means and then causing said requantizing means to perform requantization, wherein said requantizing means, upon receiving an instruction from said comparing means, reduces the number of bits further, performs requantization, and sends the result to said second encoder, and said integrating and recording means redistributes the bits of said first result of coding and said second result of coding using said first number of bits and second number of bits.

26. A digital audio signal recording apparatus as set forth in claim 25, wherein said second encoder in said second modulating means performs high efficiency coding on at least one sub-frequency band information of said second signal components by the distributed sub-words.

27. A digital audio signal recording apparatus as set forth in claim 26, wherein said second encoder in said second coding means performs entropy coding on the sub-frequency band information to be coded and said integrating and recording means performs redistribution by a variable bit rate.

28. A digital audio signal recording apparatus as set forth in claim 27, further comprising:

code tables for storing contents of codes prescribed based on the result of quantization in said requantizing means; and means for performing said high efficiency coding using said plurality of code tables, determining the code table producing the best results of coding, and outputting an indication of the code table producing the best results of coding.

29. A digital audio signal recording apparatus as set forth in claim 26, wherein:

said second encoder in said second coding means performs non-linear quantization on said sub-frequency band information to be coded and said integrating and recording means performs redistribution by a variable bit rate.

30. A digital audio signal recording apparatus as set forth in claim 26, wherein said second encoder of said second coding means performs linear predictive coding on said sub-frequency band information to be coded and said integrating and recording means performs redistribution by a fixed bit rate.

31. A digital audio signal recording apparatus as set forth in claim 26, wherein said second encoder of said second coding means performs vector quantization on said sub-frequency band information to be coded and said integrating and recording means performs redistribution by a fixed bit rate.

32. A digital audio signal recording apparatus as set forth in claim 29, wherein said second encoder in said second coding means further performs entropy coding.

33. A digital audio signal recording apparatus as set forth in claim 20, wherein said first coding means performs straight pulse code modulation (PCM), and said integrating and recording means additionally records on said recording medium information expressing by which of straight PCM or high efficiency coding the sub-frequency band information was coded.

34. A digital audio signal recording apparatus as set forth in claim 33, wherein said recording medium comprises one of a compact disk, a laser disk, or a magnetic tape.

* * * * *